(12) United States Patent
Nakano et al.

(10) Patent No.: US 11,102,456 B2
(45) Date of Patent: Aug. 24, 2021

(54) VIDEO ENCODING SYSTEM AND VIDEO ENCODING METHOD

(71) Applicant: PANASONIC I-PRO SENSING SOLUTIONS CO., LTD., Fukuoka (JP)

(72) Inventors: Satoshi Nakano, Fukuoka (JP); Jun Ikeda, Fukuoka (JP); Tetsuo Tanaka, Fukuoka (JP); Mari Yasuda, Fukuoka (JP); Manabu Higuchi, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/222,658

(22) Filed: Dec. 17, 2018

(65) Prior Publication Data

US 2019/0191129 A1 Jun. 20, 2019

(30) Foreign Application Priority Data

Dec. 18, 2017 (JP) .............................. JP2017-242086

(51) Int. Cl.
| | | |
|---|---|---|
| *H04N 7/18* | (2006.01) | |
| *H04N 19/80* | (2014.01) | |
| *H04N 5/232* | (2006.01) | |
| *H04N 21/2347* | (2011.01) | |
| *H04N 21/4223* | (2011.01) | |
| *H04N 21/234* | (2011.01) | |

(52) U.S. Cl.
CPC ......... *H04N 7/183* (2013.01); *H04N 5/23245* (2013.01); *H04N 19/80* (2014.11); *H04N 21/2347* (2013.01); *H04N 21/23418* (2013.01); *H04N 21/4223* (2013.01)

(58) Field of Classification Search
CPC ............... H04N 7/183; H04N 21/4223; H04N 21/23418; H04N 19/80; H04N 5/23245; H04N 21/2347; H04N 19/85
See application file for complete search history.

(56) References Cited

U.S. PATENT DOCUMENTS

2012/0013756 A1 * 1/2012 Ikeda .................. H04N 5/23245
348/220.1
2013/0176927 A1 * 7/2013 Karaoguz ............. H04W 88/06
370/311

(Continued)

FOREIGN PATENT DOCUMENTS

JP 2014-022970 2/2014

*Primary Examiner* — Tracy Y. Li
(74) *Attorney, Agent, or Firm* — Greenblum & Bernstein, P.L.C.

(57) ABSTRACT

A camera generates a first video having visibility lower than a predetermined visibility suitable for a process using a video in a video output apparatus, encodes the generated first video, and transmits the encoded first video, and an adjustment instruction including a parameter for adjusting the visibility of the first video to be equivalent to the predetermined visibility, to the video output apparatus. The video output apparatus acquires the first video and the adjustment instruction, transmitted from the camera, adjusts the visibility of the first video to be equivalent to the predetermined visibility by using the parameter, based on the adjustment instruction, and outputs the adjusted video to an output unit.

12 Claims, 11 Drawing Sheets

(56) References Cited

U.S. PATENT DOCUMENTS

| | | | |
|---|---|---|---|
| 2013/0330055 A1* | 12/2013 | Zimmermann | G06F 16/78 386/240 |
| 2014/0023247 A1 | 1/2014 | Kuwahara et al. | |
| 2016/0080647 A1* | 3/2016 | Kimura | H04N 1/3876 348/36 |
| 2019/0215479 A1* | 7/2019 | Jeong | G03B 11/00 |

* cited by examiner

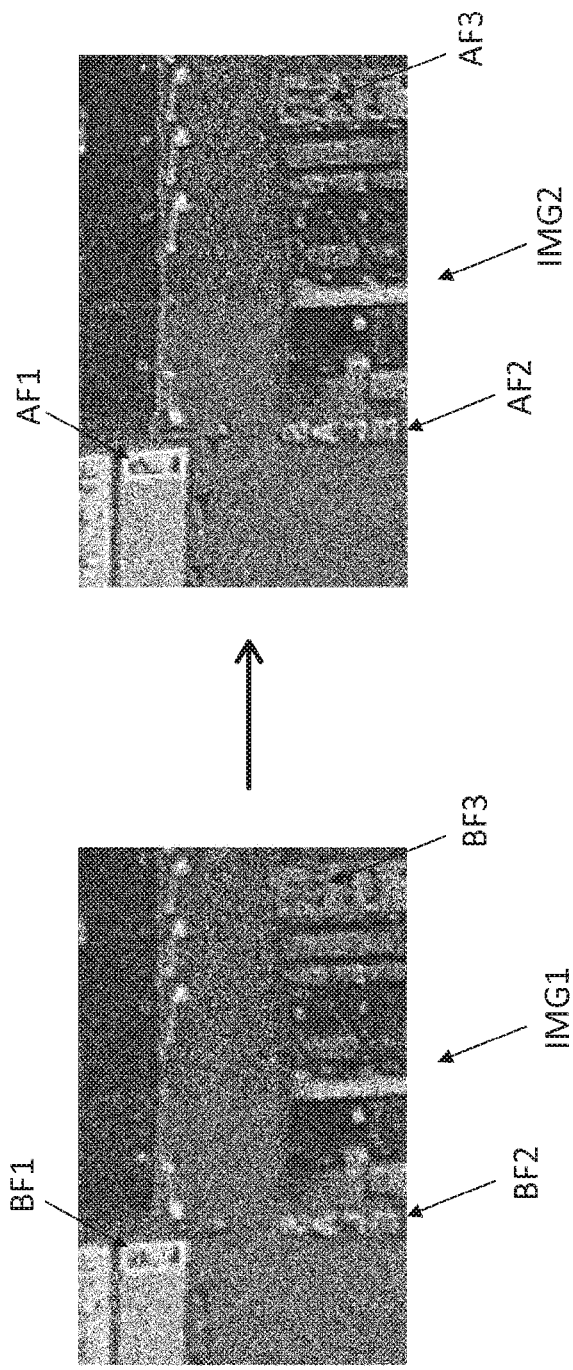

VIDEO ENCODING SYSTEM AND VIDEO ENCODING METHOD

BACKGROUND OF THE INVENTION

1. Field of the Invention

The present disclosure relates to a video encoding system and a video encoding method for encoding a video captured by a camera.

2. Background Art

In JP-A-2014-22970, in an image recognition and authentication system that transmits an image obtained by photographing with a camera to an image reception apparatus and performs a recognition authentication process of a subject based on an image by the image reception apparatus, an image transmission apparatus that suppresses a decrease in recognition accuracy is disclosed. The image transmission apparatus reduces the data amount of a plurality of input images, by a reduction method according to the recognition authentication process performed by the image reception apparatus. For example, the image transmission apparatus reduces the data amount of a plurality of images by selecting a part of images from among a plurality of images, based on the recognition authentication process performed by the image reception apparatus.

However, in the configuration of JP-A-2014-22970, in order to reduce the data amount of an image to be transmitted to the image reception apparatus, the image transmission apparatus generates an image of a subject which is a target of recognition authentication process (in other words, a normal captured image obtained by applying various types of signal processes to the electric signal of a subject image corresponding to the output of an imaging element), and then reduces the amount of data of an image itself of a best shot by always determining the presence or absence of the image of the best shot. Therefore, there is a problem that the apparatus configuration of the image transmission apparatus becomes complicated.

In addition, in JP-A-2014-22970, the data of the image received by the image reception apparatus from the image transmission apparatus through the network is a degraded image in which the data amount is reduced by the image transmission apparatus. In other words, the image reception apparatus does not receive a captured image which is generated by the image transmission apparatus and of which data amount is not reduced. Therefore, there is a possibility that data of a part of the image whose data amount has been reduced may be lost or damaged in the process of communication from the image transmission apparatus through the network, and there is also a problem that the recognition authentication process may not always be performed appropriately in the image reception apparatus.

SUMMARY OF THE INVENTION

The present disclosure has been devised in view of the above-described circumstances, and an object of the present invention is to provide a video encoding system and a video encoding method, which reduce the code amount of a captured image by reducing the visibility of the captured image transmitted from an image transmission apparatus as much as possible, and then appropriately adjusts the visibility of the captured image to be equivalent to desired visibility after the captured image whose code amount has been reduced is received by the image reception apparatus.

The present disclosure provides a video encoding system including a camera that captures a video; and a video output apparatus that outputs the video captured by the camera. The camera and the video output apparatus are connected so as to be capable of communicating with each other. The camera generates a first video having visibility lower than a predetermined visibility suitable for a process based on a video in the video output apparatus, encodes the generated first video, and transmits the encoded first video and an adjustment instruction including an image processing parameter for adjusting the visibility of the first video to be equivalent to the predetermined visibility, to the video output apparatus. The video output apparatus acquires the first video and the adjustment instruction, generated by the camera, and adjusts the visibility of the first video to be equivalent to the predetermined visibility by using the image processing parameter, based on the adjustment instruction.

The present disclosure provides a video encoding system including a camera that captures a video; and a video output apparatus that outputs the video captured by the camera. The camera and the video output apparatus are connected so as to be capable of communicating with each other. The camera generates a first video having visibility lower than a predetermined visibility suitable for a process based on a video in the video output apparatus, encodes the generated first video, and transmits the encoded first video to the video output apparatus. The video output apparatus acquires the first video generated by the camera, and adjusts the visibility of the first video to be equivalent to the predetermined visibility, based on the acquired first video.

The present disclosure provides a video encoding method implemented by a video encoding system having a camera and a video output apparatus that outputs the video captured by the camera, which are connected so as to be capable of communicating with each other. The method includes capturing a video, generating a first video having visibility lower than a predetermined visibility suitable for a process based on a video in the video output apparatus, encoding the generated first video, transmitting the encoded first video and an adjustment instruction including an image processing parameter for adjusting the visibility of the first video to be equivalent to the predetermined visibility, to the video output apparatus, acquiring the first video and the adjustment instruction, transmitted from the camera, and adjusting the visibility of the first video to be equivalent to the predetermined visibility by using the image processing parameter, based on the adjustment instruction.

The present disclosure provides a video encoding method implemented by a video encoding system having a camera and a video output apparatus that outputs the video captured by the camera, which are connected so as to be capable of communicating with each other. The method includes generating a first video having visibility lower than a predetermined visibility suitable for a process based on a video in the video output apparatus, encoding the generated first video and transmits the encoded first video to the video output apparatus, decoding the first video transmitted from the camera, and adjusting the visibility of the first video to be equivalent to the predetermined visibility, based on the acquired first video.

According to the present disclosure, it is possible to reduce the code amount of a captured image by lowering the visibility of the captured image transmitted from an image transmission apparatus as much as possible, and after the captured image having the reduced code amount is received

BRIEF DESCRIPTION OF THE DRAWINGS

FIG. 5A is a diagram showing an example in which a first video is restored to a video having visibility equivalent to a predetermined visibility by edge emphasis.

DETAILED DESCRIPTION OF THE EXEMPLARY EMBODIMENT

Hereinafter, each embodiment specifically disclosing a video encoding system and a video encoding method according to the present disclosure will be described in detail with reference to the accompanying drawings as appropriate. However, a detailed description more than necessary may be omitted. For example, detailed descriptions of already well-known matters and duplicate descriptions of substantially identical components may be omitted in some cases. This is to avoid the unnecessary redundancy of the following description and to facilitate understanding by those skilled in the art. In addition, the accompanying drawings and the following description are provided to enable those skilled in the art to fully understand the present disclosure, and are not intended to limit the subject matter described in the claims.

In each of embodiments described below, a use case will be described in which in public facilities such as stores, factories, offices, government offices or libraries (hereinafter these places are collectively referred to as "monitored spaces"), a camera installed in a conspicuous part of a street for surveillance purposes (so-called surveillance camera) transmits data of a captured image (in other words, a video) of a subject, to a recorder or a client terminal installed in the office of the monitored space or an external monitoring center (hereinafter, these places are collectively referred to as "monitoring room"), through a network. However, it is needless to say that the use case of each embodiment is not limited to the above example.

Embodiment 1

Figure 1:
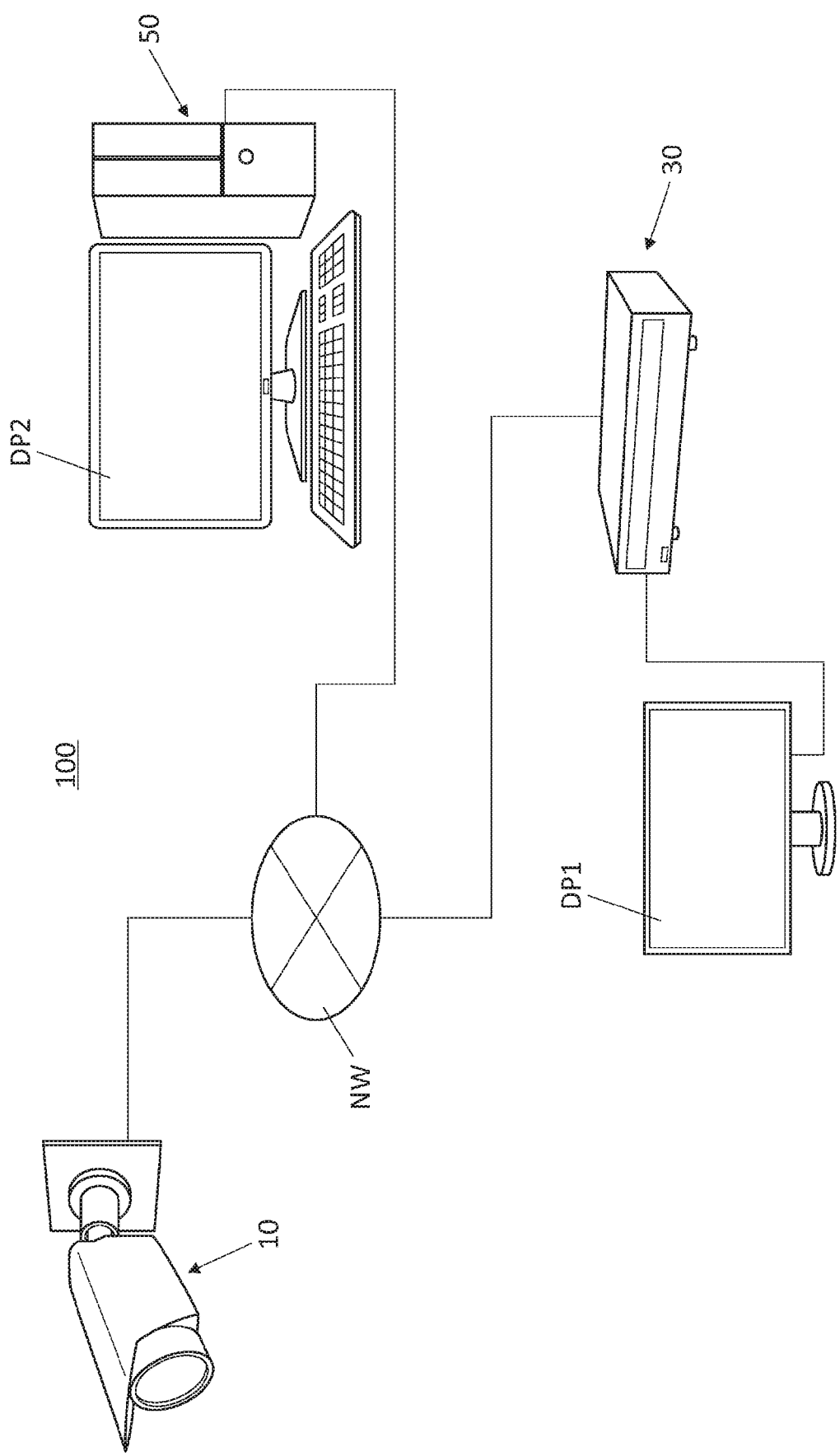
FIG. 1 is a block diagram showing a system configuration example of a video encoding system according to each embodiment.

FIG. 1 is a block diagram showing a system configuration example of a video encoding system 100 according to each embodiment. The video encoding system 100 has a configuration including at least one camera 10 installed on the ceiling surface or the wall surface of a monitored space (see above) for monitoring purpose, for example, a recorder 30 (see above) installed in a monitoring room, and a client terminal 50 installed in the monitoring room (see above). Although only one camera 10 is illustrated in FIG. 1, a plurality of cameras 10 having the same configuration may be connected to a network NW. The recorder 30 and the client terminal 50 may be installed in the same monitoring room or in different monitoring rooms.

In FIG. 1, at least one camera 10, the recorder 30, and the client terminal 50 are connected through the network NW. The network NW may be configured using a wired network (for example, a local area network (LAN)) such as the Internet or an intranet, or may be configured using a wireless network (for example, a wireless LAN such as Wi-Fi (registered trademark)).

The camera 10 which is an example of a video transmission apparatus captures an image of a subject in a monitored space in which the camera 10 is installed, performs various signal processes on the electrical signal of the subject image obtained by capturing, and generates video data. In Embodiment 1, since the camera 10 reduces the code amount at the time of encoding the video data before transmitting video data, the camera 10 generates video data by performing necessary minimum signal processes on the electric signal of the subject image, among the above-described various signal processes. In other words, the camera 10 generates video data (hereinafter referred to as a "first video") having visibility (in other words, the image quality of the video. The same applies hereinafter.) lower than a predetermined visibility (that is, the image quality as an index showing a high degree of goodness of a video obtained by signal processes such as gain adjustment and edge emphasis) suitable for a process (for example, an authentication process) using a video in the client terminal 50. In this specification, the term "visibility" may be replaced with the term "image quality" as appropriate. Since the data of the first video is smaller in size than the data of the video having the predetermined visibility described above, it is possible to reduce the code amount when the camera 10 performs encoding. The above-described authentication process using the video in the client terminal 50 corresponds to, for example, face detection, person count, and license plate authentication. Thus, the camera 10 can transmit video data while suppressing an increase in load on the network NW. The camera 10 encodes the above-described first video data and an image quality adjustment instruction including an image processing parameter (for example, a filter coefficient in edge emphasis) for adjusting the visibility (in other words, image quality) of the first video to be equivalent to the above-described predetermined visibility, and transmits the encoded first video and image quality instruction. The camera 10 may encode the data of the first video and transmit the encoded first video data and the above-described image quality adjustment instruction. That is, the camera 10 may transmit the image quality adjustment instruction itself to the recorder 30 or the client terminal 50 without encoding.

The camera 10 is a surveillance camera capable of capturing an image of a subject (for example, a place near an automatic door at the entrance of a store where people are conspicuous) at an angle of view set in advance at the time of installation. The camera 10 transmits the data of the video to the recorder 30, the client terminal 50, or both the recorder 30 and the client terminal 50, in association with the information on the imaging date and time. The destination to which the camera 10 transmits data is set in advance for the camera 10, for example, at the stage of initial setting such as before the operation of the video encoding system 100 is started.

The recorder 30, which is an example of a video output apparatus, a recording apparatus, or a receiving apparatus, receives through the network NW, data of a video transmitted from the camera 10 (for example, generated by the camera 10) and records the video data. The recorder 30 decodes (for example, decodes) and acquires the received video data and image quality adjustment instruction. When the image quality adjustment instruction is not encoded and is transmitted as it is by the camera 10, the recorder 30 may decode only the video data. The recorder 30 performs an image quality adjustment process such that the visibility of the first video becomes equivalent to the above-described predetermined visibility (in other words, performs a high image quality process of a video in order to obtain a video suitable for the process (for example, a recognition process) performed in the recorder 30), by using the image processing parameter included in the image quality adjustment instruction, based on the acquired image quality adjustment instruction. Thus, the recorder 30 can restore and acquire data of a video having visibility equivalent to a predetermined visibility (high image quality) obtained by the camera 10 performing various types of signal processes (for example, gain adjustment and edge emphasis) in order to obtain the above-described predetermined visibility. The recorder 30 may output the acquired video data to the output unit DP1 (for example, a display device such as a liquid crystal display (LCD) or an organic electroluminescence (EL)) connected to the recorder 30 and display the video data. The output unit DP1 may be incorporated in the recorder 30.

The client terminal 50, which is an example of a video output apparatus, a recording apparatus, or a receiving apparatus, receives through the network NW, data of a video transmitted from the camera 10 (for example, generated by the camera 10) and records the video data. The client terminal 50 decodes (for example, decodes) and acquires the received video data and image quality adjustment instruction. When the image quality adjustment instruction is not encoded and is transmitted as it is by the camera 10, the client terminal 50 may decode only the video data. The client terminal 50 performs an image quality adjustment process such that the visibility of the first video becomes equivalent to the above-described predetermined visibility (in other words, performs a high image quality process of a video in order to obtain a video suitable for the recognition process performed in the client terminal 50), by using the image processing parameter included in the image quality adjustment instruction, based on the acquired image quality adjustment instruction. Thus, the client terminal 50 can restore and acquire data of a video having visibility equivalent to a predetermined visibility (high image quality) obtained by the camera 10 performing various types of signal processes (for example, gain adjustment and edge emphasis) in order to obtain the above-described predetermined visibility. The client terminal 50 may output the acquired video data to the output unit DP2 (for example, a display device such as an LCD or an organic EL) connected to the client terminal 50 and display the video data. The output unit DP2 may be incorporated in the client terminal 50.

Figure 2:
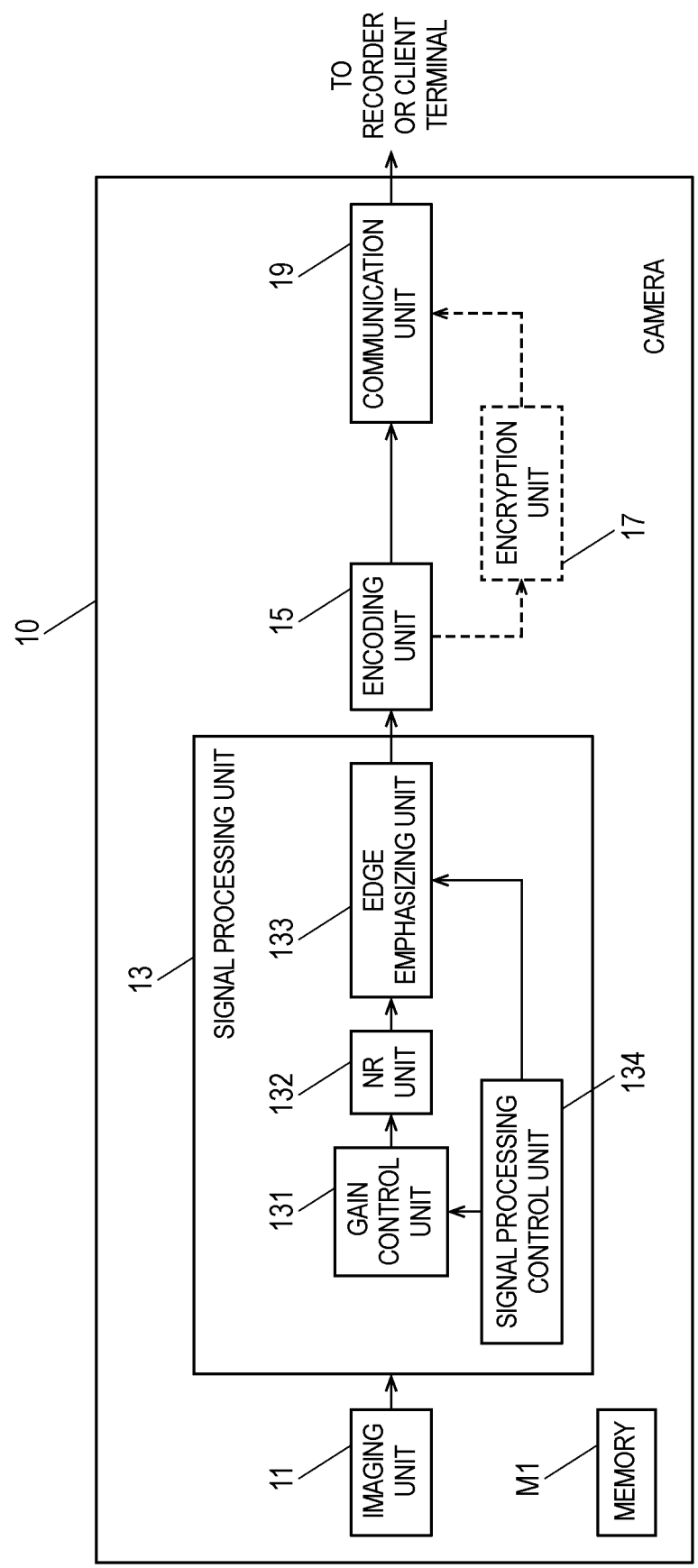
FIG. 2 is a block diagram showing an internal configuration example of a camera according to Embodiment 1.

FIG. 2 is a block diagram showing an internal configuration example of the camera 10 according to Embodiment 1. The camera 10 has a configuration including at least an imaging unit 11, a signal processing unit 13, an encoding unit 15, an encryption unit 17, a communication unit 19, and a memory M1. The encryption unit 17 may be provided inside the signal processing unit 13.

The imaging unit 11 has a configuration including a condensing lens and a solid-state imaging device such as a charge coupled device (CCD) type image sensor or a complementary metal oxide semiconductor (CMOS) type image sensor. While the camera 10 is powered on, the imaging unit 11 constantly outputs an electric signal of the subject image obtained based on imaging by the solid-state imaging device to the signal processing unit 13. Further, the imaging unit 11 may include a mechanism (for example, a pan tilt zoom mechanism) that changes the imaging direction of the camera 10 and the zoom magnification during imaging.

The signal processing unit 13 is configured by using, for example, a processor such as a central processing unit (CPU), a micro processing unit (MPU), a digital signal processor (DSP), or a field programmable gate array (FPGA).

The signal processing unit 13 functions as a control unit of the camera 10, and performs a control process for integrally controlling the operation of each unit of the camera 10, a data input and output process between respective units of the camera 10, a data operation (calculation) process, and a data storage process. The signal processing unit 13 operates according to the program and data stored in the memory M1. The signal processing unit 13 has, for example, a timer (not shown) and acquires current time information.

The signal processing unit 13 uses the memory M1 during operation and performs various types of signal processes on the electric signal of the subject image output from the imaging unit 11 to generate data of a first video having visibility lower than the above-described predetermined visibility or data of a video (hereinafter referred to as "second video") having visibility equivalent to the above-described predetermined visibility. Thus, the data of the first video or the second video is generated including the information on the date and time when the imaging unit 11 captures an image. In FIG. 2, the configuration of the signal processing unit 13 is illustrated as an example in order to show the contents of various types of signal processes performed by the signal processing unit 13.

Specifically, the signal processing unit 13 includes a gain control unit 131, a noise reduction (NR) unit 132, an edge emphasizing unit 133, and a signal processing control unit 134. The output of the imaging unit 11 (that is, an electric signal of a subject image captured by the imaging unit 11) is input to the signal processing unit 13. The output of the signal processing unit 13 is input to the encoding unit 15.

In a case of generating data of the first video, the signal processing unit 13 generates an image quality adjustment instruction including an image processing parameter (see the following description) for adjusting image quality such that the visibility of the first video is equivalent to the above-described predetermined visibility, in the recorder 30 or the client terminal 50, connected to the camera 10. The signal processing unit 13 outputs the generated data of the first video and the image quality adjustment instruction to the encoding unit 15. On the other hand, in a case of generating the data of the second video, the signal processing unit 13 does not generate the above-described image quality adjustment instruction and outputs the generated data of the second video to the encoding unit 15.

Upon receipt of an instruction to execute automatic gain control from the signal processing control unit 134, the gain control unit 131 performs the process of automatic gain control (AGC) using the output of the imaging unit 11. Thus, the gain control unit 131 can adjust appropriately the brightness of the captured image corresponding to the electric signal of the subject image which is the output of the imaging unit 11 (in other words, the luminance value of each pixel constituting the imaging surface of the solid-state imaging device) (see FIG. 5B). On the other hand, upon receipt of an instruction not to execute automatic gain control from the signal processing control unit 134, the gain control unit 131 omits the automatic gain control process described above and outputs the output of the imaging unit 11 to the NR unit 132.

The NR unit 132 performs a noise reduction process for reducing the noise component superimposed on the electric signal of the subject image by using the output of the gain control unit 131. Since the noise reduction process in the NR unit 132 is performed by a known technique, a detailed description thereof will be omitted. In the signal processing unit 13 of the camera 10, it is preferable that the noise reduction process by the NR unit 132 is not omitted. This is because there is a possibility that the noise component is superimposed on the electric signal of the subject image at the imaging time of the camera 10, and unnecessary noise components are reduced by performing noise reduction processing in advance before encoding by the encoding unit 15, which leads to a reduction in the code amount in the encoding unit 15.

Upon receiving an instruction to execute edge emphasis from the signal processing control unit 134, the edge emphasizing unit 133 performs the edge emphasis process using the output of the NR unit 132. The edge emphasis process is executed by using a so-called known technique, for example, using a filter (an example of an image processing parameter) having a size corresponding to 3*3 pixels and having a filter coefficient corresponding to each pixel. * (Asterisk) is a multiplication operator. Through the edge emphasis process, for example, a video with high visibility is obtained in which the subject portion (in other words, not the background portion) such as texts, numbers, human faces, and contours in the video is conspicuous. On the other hand, upon receiving an instruction not to execute edge emphasis from the signal processing control unit 134, the edge emphasizing unit 133 omits the edge emphasis process described above and outputs the output of the NR unit 132 to the encoding unit 15.

The signal processing control unit 134 refers to the setting information retained in the memory M1, for example, and outputs an execution instruction or a non-execution instruction of the automatic gain control to the gain control unit 131. The setting information retained in the memory M1 includes information indicating the presence or absence of the execution of the automatic gain control. The signal processing control unit 134 refers to the setting information retained in the memory M1, for example, and outputs an execution instruction or a non-execution instruction of the edge emphasis to the edge emphasizing unit 133. When outputting an instruction to execute edge emphasis to the edge emphasizing unit 133, the signal processing control unit 134 may output the execution instruction in which a filter coefficient (an example of an image processing parameter) included in the setting information retained in the memory M1, to the edge emphasizing unit 133.

Generation of an image quality adjustment instruction in the signal processing control unit 134 of the signal processing unit 13 (for example, an indication of a filter coefficient to be used for edge emphasis in the recorder 30 or the client terminal 50) will be briefly described.

It is assumed that the current operation mode of the camera 10 is set to a mode for generating a second video (hereinafter referred to as "second mode"), and the signal processing control unit 134 performs edge emphasis with a value A (for example, A=16) of edge emphasis intensity in the edge emphasizing unit 133. The current operation mode of the camera 10 is one of a mode (hereinafter referred to as "first mode") for the signal processing unit 13 to generate a first video or the second mode, and information indicating the current operation mode is retained in the memory M1. Further, when setting the current operation mode to the second mode, the signal processing control unit 134 sets the filter coefficient (F1) having the following contents, as the 3*3 filter coefficient corresponding to the value A of the edge emphasis intensity in the edge emphasizing unit 133, in the edge emphasizing unit 133 as an image processing parameter. The filter coefficient (F1) indicates that among total nine pixels of 3*3 with the pixel to be subjected to edge emphasis as the center, the pixel value of the center pixel is doubled, the pixel values of total eight surrounding pixels are (−4/32) times, and edge emphasis is performed by the added value of the pixel values. (3*3 filter coefficient corresponding to intensity value A)

$$-4/32 \quad -4/32 \quad -4/32$$

$$-4/32 \quad 64/32 \quad -4/32$$

$$-4/32 \quad -4/32 \quad -4/32 \quad \quad (F1)$$

Here, for example, when a trigger process (see later) for changing the operation mode is executed, the signal processing unit 13 of the camera 10 changes the current operation mode from the second mode to the first mode. In this case, the signal processing control unit 134 changes the value of the edge emphasis intensity in the edge emphasizing unit 133 from A (for example A=16) to B (for example B=10). Along with this, the signal processing control unit 134 sets the filter coefficient (F2) having the following contents, as the 3*3 filter coefficient corresponding to the value B of the edge emphasis intensity in the edge emphasizing unit 133, in the edge emphasizing unit 133 as an image processing parameter. The filter coefficient (F2) indicates that among total nine pixels of 3*3 with the pixel to be subjected to edge emphasis as the center, the pixel value of the center pixel becomes equal (for example, one time), the pixel values of total eight surrounding pixels are 0 (=−0/32) times, and thus edge emphasis is not performed as a result. (3*3 filter coefficient corresponding to intensity value B)

$$-0/32 \quad -0/32 \quad -0/32$$

$$-0/32 \quad 32/32 \quad -0/32$$

$$-0/32 \quad -0/32 \quad -0/32 \quad \quad (F2)$$

Accordingly, when changing the current operation mode to the first mode, when the filter coefficient (F2) corresponding to the value B of the edge emphasis intensity in the edge emphasizing unit 133 (in other words, edge emphasis is not performed), the signal processing control unit 134 generates, for example, information such as "numerator 4, denominator 32" as an image processing parameter to be included in the image quality adjustment instruction in the recorder 30 or the client terminal 50. That is, the signal processing control unit 134 instructs the recorder 30 or the client terminal 50 to generate a video having visibility equivalent to the above-described predetermined visibility from the data of the first video, by using the same filter coefficient (F1) (as the filter coefficient (F1) of 3*3 corresponding to the intensity value A), by using information "numerator 4, denominator 32".

As described above, the signal processes executed in the signal processing unit 13 are not limited to the automatic gain control, the NR process, and the edge emphasis shown in FIG. 2. In consideration of the possibility that noise may be superimposed on the output of the imaging unit 11 before encoding by the encoding unit 15, the signal processing unit 13 performs an NR process, but in addition thereto, processes such as electrical shake correction (EIS: Electric Image Stabilizer), optical shake correction (OIS: Optical Image Stabilizer), distortion correction, and pixel scratch correction of a solid-state imaging device (all of which are well-known techniques and detailed explanation of individual techniques is omitted) are preferably performed not by the recorder 30 or the client terminal 50 but by the camera 10. Thus, the noise component superimposed on the electric signal of the subject image obtained from the imaging unit 11 is reduced, or the content of the video when the camera 10 itself is fluctuating can be appropriately corrected and unnecessary noise components are reduced, so the code amount of data in the encoding unit 15 can be reduced.

On the other hand, it is preferable that the following signal processes (all well-known techniques and detailed explanation of individual techniques is omitted) are not executed on the camera 10 side but are performed on the recorder 30 side or the client terminal 50 side. Specifically, the processes are edge emphasis, automatic gain control, white balance processing, γ correction (γ value for obtaining a video having visibility equivalent to the above-described predetermined visibility), gradation correction (for example, fog correction, dark area correction, bright portion correction), correction for light falloff at the peripheral portion of the frame constituting the video, correction for deterioration of the resolution of the peripheral portion of the frame constituting the video, and the like. However, regarding edge emphasis, image processing parameters included in the image quality adjustment instruction transmitted from the camera 10 to the recorder 30 or the client terminal 50 (for example, filter coefficients used for edge emphasis for image quality adjustment in the recorder 30 or the client terminal 50) are preferably instructed by the camera 10.

The encoding unit 15 is configured using, for example, a processor such as a CPU, an MPU, a DSP, or an FPGA. The encoding unit 15 refers to the setting information retained in the memory M1, for example, and encodes the data of the first video or the second video generated by the signal processing unit 13 by using encoding parameters (for example, a coding rate or a compression rate) included in the setting information. The encoding unit 15 outputs the data of the encoded first video or second video to the encryption unit 17 or the communication unit 19. When the setting information indicates that the data transmitted from the camera 10 is encrypted, the encoding unit 15 outputs the data of the encoded first video or the second video to the encryption unit 17. On the other hand, when the setting information does not indicate that the data transmitted from the camera 10 is to be encrypted, the encoding unit 15 outputs the data of the encoded first video or the second video to the communication unit 19.

The encryption unit 17 is configured using, for example, a processor such as a CPU, an MPU, a DSP, or an FPGA. The encryption unit 17 encrypts the output of the encoding unit 15 using the encryption key common to the recorder 30 and the client terminal 50, for example, and outputs the encrypted output to the communication unit 19. In the encryption process, for example, a public key encryption method may be used instead of a common encryption key. As will be described later, when the setting information indicates that the data transmitted from the camera 10 is to be encrypted, the signal processing unit 13 generates data of the first video. This is because, when the data of video is encrypted in the encryption unit 17, the contents of video is not seen by a third party until the data is decrypted in the recorder 30 or the client terminal 50, the video may be restored into a video having the visibility equivalent to the above-described predetermined visibility (high image quality) in the recorder 30 or the client terminal 50, and thus it is not necessary to increase the code amount of the camera 10 by generating a video having the visibility equivalent to the above-described predetermined visibility (high image quality) in the camera 10. The camera 10 may generate the first video data even in a case of performing communication (for example, secure socket layer (SSL) communication) in which the network path (in other words, communication path) between the camera 10 and the recorder 30 or the client terminal 50 is encrypted, as well as when the video data is encrypted in the encryption unit 17. In this case, between the camera 10 and the recorder 30 or the client terminal 50, SSL communication in which the communication path itself is encrypted is performed in accordance with a predetermined communication protocol. In the following description, the camera 10 generates data of the first video, when the data of the video is encrypted in the encryption unit 17.

In the present specification, the processing order of the encoding process in the encoding unit 15 and the encryption process in the encryption unit 17 in the camera 10 is not limited. In other words, the encryption process may be performed after the encoding process is performed first, or in the reverse order, that is, the encoding process may be performed after the encryption process is performed. In this case, the encryption unit 17 encrypts the data of the first video or the second video generated by the signal processing unit 13, and sends the output to the encoding unit 15. The encoding unit 15 encodes the data of the encrypted first video or the second video.

The communication unit 19 transmits the first video data or the second video data output from the encoding unit 15 or the encryption unit 17 to the recorder 30 or the client terminal 50. Further, the communication unit 19 may receive the setting information on the operation of the camera 10 from the client terminal 50 and store the setting information in the memory M1.

The memory M1 is configured by using, for example, a random access memory (RAM) and a read only memory (ROM), and temporarily stores programs and data necessary for executing the operation of the camera 10, information, data, or the like generated during operation. The RAM is, for example, a working memory used in the operation of the signal processing unit 13. The ROM stores in advance a program and data for controlling the signal processing unit 13, for example. Further, the memory M1 stores, for example, identification information (for example, a serial number) for identifying the camera 10 and various types of setting information. The memory M1 includes the above-described encoding parameters (for example, a coding rate), and retains setting information including filter coefficients in edge emphasis (an example of image processing parameters), the presence or absence of encryption, the presence or absence of automatic gain control or edge emphasis, an encryption key, and the like.

Figure 3:
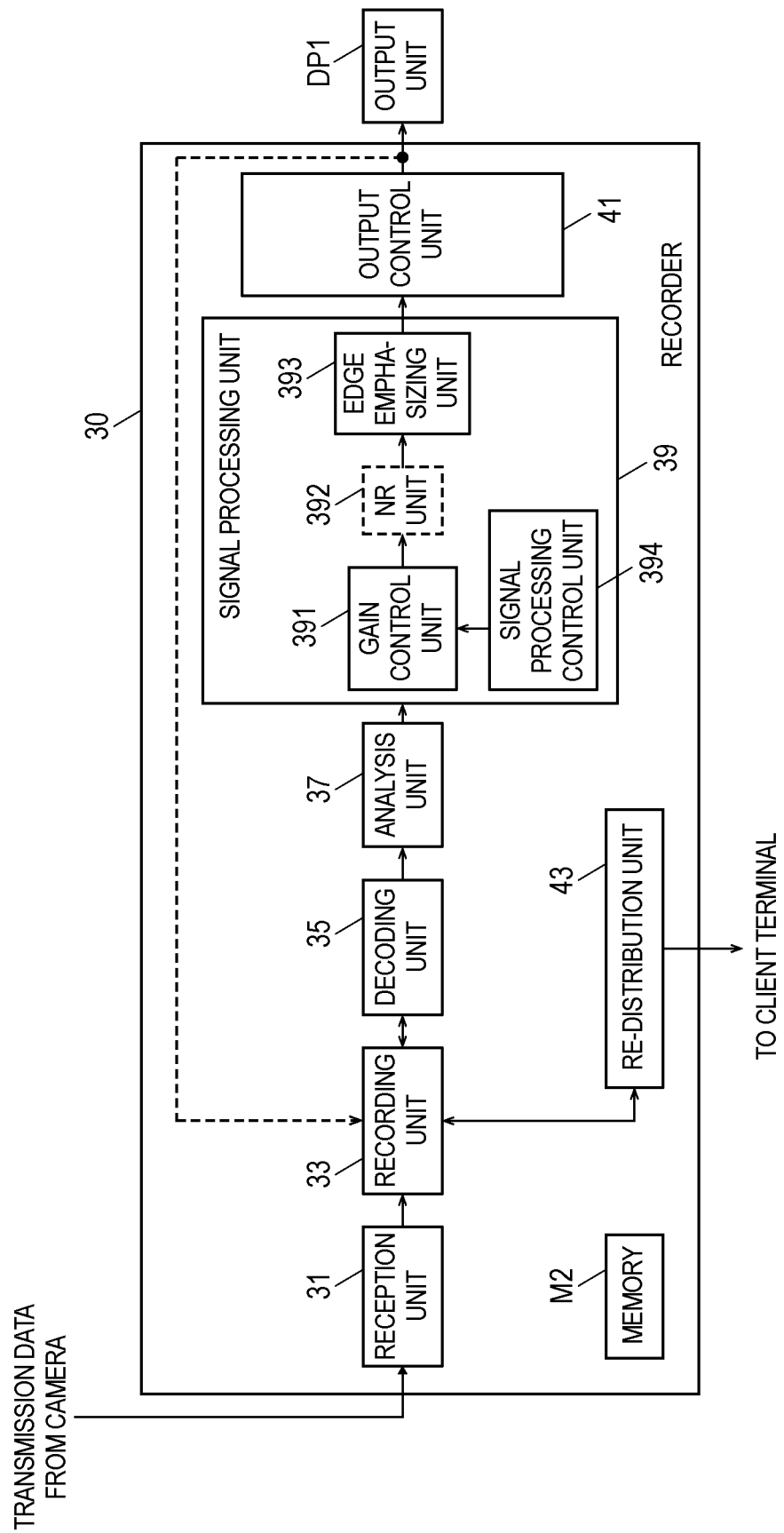
FIG. 3 is a block diagram showing an internal configuration example of a recorder according to Embodiment 1.

FIG. 3 is a block diagram showing an internal configuration example of the recorder 30 according to Embodiment 1. The recorder 30 has a configuration including at least a reception unit 31, a recording unit 33, a decoding unit 35, an analysis unit 37, a signal processing unit 39, an output control unit 41, a re-distribution unit 43, and a memory M2. As described above, the output unit DP1 may be configured separately from the recorder 30 or may be built in the recorder 30.

The reception unit 31 receives the data transmitted from the camera 10 and stores the data in the recording unit 33. The data transmitted from the camera 10 is one of data of the first video and an image quality adjustment instruction, data of the first video and data in which the image quality adjustment instruction is encrypted, data of the second video, or data in which data of the second video is encrypted. The image quality adjustment instruction itself may be transmitted to the recorder 30 without being encrypted by the camera 10.

The recording unit 33 is a semiconductor memory (for example, a flash memory), a hard disk drive (HDD), a solid state drive (SSD) built in the recorder 30, or an external storage medium such as a memory card (for example, an SD card) not built in the recorder 30. The recording unit 33 records the data received by the reception unit 31. When the recording unit 33 is a memory card, the recording unit 33 is detachably attached to the casing of the recorder 30. The recording unit 33 may store data obtained by decoding the data received by the reception unit 31 by the decoding unit 35 or data of a video whose image quality is adjusted (restored) so as to have visibility equivalent to the above-described predetermined visibility by the signal processing unit 39.

The decoding unit 35 is configured using, for example, a processor such as a CPU, an MPU, a DSP, or an FPGA. The decoding unit 35 reads and decodes the data stored in the recording unit 33 (that is, the data received by the reception unit 31). In the case where the data received by the reception unit 31 has been encrypted by the camera 10, the decoding unit 35 decrypts the data by using an encryption key common to the camera 10, and then decodes the encoded data.

The analysis unit 37 is configured using, for example, a processor such as a CPU, an MPU, a DSP, or an FPGA. The analysis unit 37 determines whether or not the image quality adjustment instruction is included in the output of the decoding unit 35. When it is determined that the image quality adjustment instruction is included, the analysis unit 37 analyzes the contents, and analyzes what filter coefficient may be used in edge emphasis for the first video data included in the output of the decoding unit 35 and what other signal process (for example, automatic gain control) may be performed. The analysis unit 37 outputs the first video data and the analysis result regarding the image quality adjustment process to the signal processing unit 39. Further, the analysis unit 37 writes the analysis result regarding the image quality adjustment process in addition to the setting information retained in the memory M2. The added analysis result is referred to and used in the image quality adjustment process by the signal processing unit 59. When the image quality adjustment instruction is not included in the output of the decoding unit 35 (that is, a second video is generated by the camera 10), the analysis unit 37 may output data of the second video directly to the output control unit 41.

The signal processing unit 39 is configured using, for example, a processor such as a CPU, an MPU, a DSP, or an FPGA. The signal processing unit 39 functions as a control unit of the recorder 30, and performs a control process for integrally controlling the operation of each unit of the recorder 30, a data input and output process between respective units of the recorder 30, a data operation (calculation) process, and a data storage process. The signal processing unit 39 operates according to the program and data stored in the memory M2. The signal processing unit 39 has, for example, a timer (not shown) and acquires current time information.

The signal processing unit 39 performs a predetermined recognition process (for example, face detection, counting of the number of people, recognition of a license plate of a vehicle and a head mark of a railroad) by using video data recorded in the recording unit 33.

The signal processing unit 39 uses the memory M2 during operation, and generates data of a video having visibility equivalent to the above-described predetermined visibility from the data of the first video, based on the image quality adjustment instruction output from the analysis unit 37, by using the image processing parameter (for example, information for specifying the filter coefficient) included in the image quality adjustment instruction. In FIG. 3, the configuration of the signal processing unit 39 is illustrated as an example in order to show the contents of various types of signal processes performed by the signal processing unit 39.

Specifically, the signal processing unit 39 includes a gain control unit 391, an NR unit 392, an edge emphasizing unit 393, and a signal processing control unit 394. The output of the analysis unit 37 (that is, the first video data decoded by the decoding unit 35 and the image quality adjustment instruction generated by the camera 10) is input to the signal processing unit 39. The output of the signal processing unit 39 is input to the output control unit 41.

Upon receipt of an instruction to execute automatic gain control from the signal processing control unit 394, the gain control unit 391 performs the process of automatic gain control (AGC) using the output (data of the first video) of the analysis unit 37. Thus, the gain control unit 391 can adjust appropriately the brightness of the data of the first video which is the output of the analysis unit 37 (see FIG. 5B). On the other hand, upon receipt of an instruction not to execute automatic gain control from the signal processing control unit 394, the gain control unit 391 omits the automatic gain control process described above and outputs the output (data of the first video) of the analysis unit 37 to the NR unit 332.

The NR unit 392 performs a noise reduction process for reducing the noise component superimposed on the data of the first video by using the output of the gain control unit 391. Since the noise reduction process in the NR unit 392 is performed by a known technique, a detailed description thereof will be omitted. The noise reduction process in the NR unit 392 may be omitted or may be executed without omission, in the signal processing unit 39 of the recorder 30.

Upon receiving an instruction to execute edge emphasis from the signal processing control unit 394, the edge emphasizing unit 393 performs the edge emphasis process using the output (data of the first video) of the NR unit 392 such that the visibility of the first video is equivalent to the above-described predetermined visibility (high image quality). The edge emphasis process is executed by using a so-called known technique, for example, using a filter (an example of an image processing parameter) having a size corresponding to 3*3 pixels and having a filter coefficient corresponding to each pixel. Through the edge emphasis process, for example, a video with high visibility is obtained in which the subject portion (in other words, not the background portion) such as texts, numbers, human faces, and contours in the video is conspicuous. On the other hand, upon receiving an instruction not to execute edge emphasis from the signal processing control unit 394, the edge emphasizing unit 393 omits the edge emphasis process described above and outputs the output of the NR unit 392 to the output control unit 41.

The signal processing control unit 394 refers to the setting information retained in the memory M2, for example, and outputs an execution instruction or a non-execution instruction of the automatic gain control to the gain control unit 391. The setting information retained in the memory M2 includes information indicating the presence or absence of the execution of the automatic gain control. The signal processing control unit 394 refers to the setting information retained in the memory M2, for example, and outputs an execution instruction or a non-execution instruction of the edge emphasis to the edge emphasizing unit 393. When outputting an instruction to execute edge emphasis to the edge emphasizing unit 393, the signal processing control unit 394 may specify and obtain the filter coefficient, based on information for specifying the filter coefficient (in other words, information for specifying the filter coefficient, analyzed by the analysis unit 37), which is included in the setting information retained in the memory M2, and output the execution instruction including the filter coefficient to the edge emphasizing unit 393.

Here, an image quality adjustment process in the signal processing control unit 394 of the signal processing unit 39 (for example, edge emphasis in the recorder 30) will be briefly described.

The signal processing control unit 394 extracts information for specifying the filter coefficient (in other words, information for specifying the filter coefficient, analyzed by the analysis unit 37) to be used in edge emphasis by the edge emphasizing unit 393, from the output (analysis result) of the analysis unit 37. For example, the signal processing control unit 394 extracts information such as "numerator 4, denominator 32" as information for specifying the filter coefficient (in other words, information for specifying the filter coefficient, analyzed by the analysis unit 37). The signal processing control unit 394 generates an instruction to execute edge emphasis including the filter coefficient equivalent to the filter coefficient (F1), based on the extracted information such as "numerator 4, denominator 32", and outputs the generated instruction to the edge emphasizing unit 393.

The edge emphasizing unit 393 performs setting to use the filter coefficient included in the execution instruction from the signal processing control unit 394, and performs the edge emphasis process using the output of the NR unit 392 (first video data) and the filter coefficient set based on the execution instruction from the signal processing control unit 394 such that the visibility of the first video is equivalent to the above-described predetermined visibility (high image quality). Thus, the signal processing unit 39 of the recorder 30 can adjust the image quality of the first video such that the visibility of the first video generated by the camera 10 is equivalent to the above-described predetermined visibility (high image quality), and can obtain video data with high visibility.

The output control unit 41 outputs the data of a video having the visibility equivalent to the above-described predetermined visibility (high image quality) generated by the signal processing unit 39, to the output unit DP1, or records the data of the video in the recording unit 33.

The re-distribution unit 43 transmits the data recorded in the recording unit 33 to the client terminal 50 at a predetermined timing (for example, a periodic timing or a timing at which instruction information based on the input operation of the user is input).

The memory M2 is configured by using, for example, a RAM and a ROM, and temporarily stores programs and data necessary for executing the operation of the recorder 30, information, data, or the like generated during operation. The RAM is, for example, a working memory used in the operation of the signal processing unit 39. The ROM stores in advance a program and data for controlling the signal processing unit 39, for example. Further, the memory M2 stores, for example, identification information (for example, a serial number) for identifying the recorder 30 and various types of setting information. The memory M2 stores setting information including the presence or absence of decryption for encryption, the presence or absence of automatic gain control or edge emphasis, an encryption key, and the like.

Figure 4:
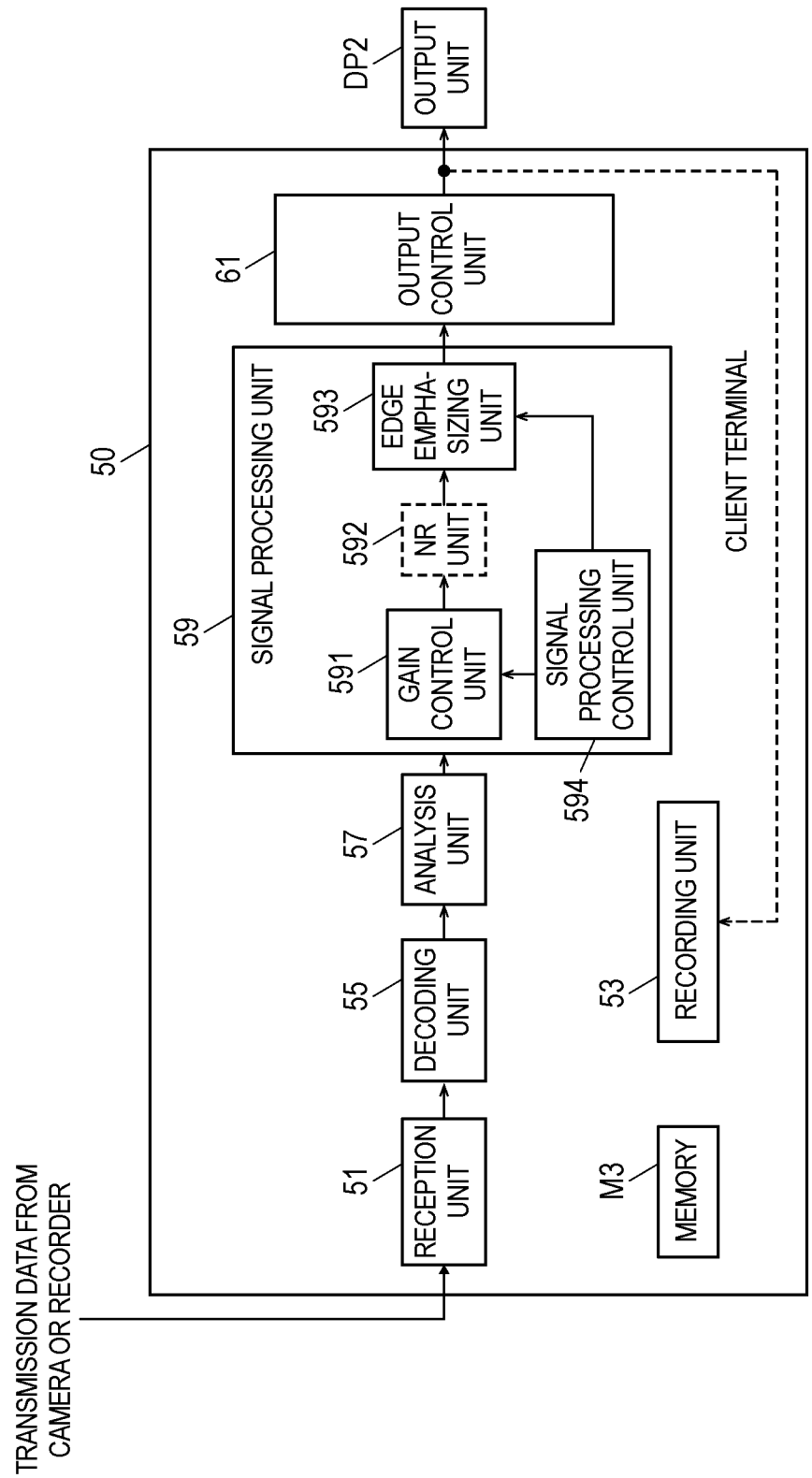
FIG. 4 is a block diagram showing an internal configuration example of a client terminal according to Embodiment 1.

FIG. 4 is a block diagram showing an internal configuration example of the client terminal 50 according to Embodiment 1. The client terminal 50 has a configuration including at least a reception unit 51, a recording unit 53, a decoding unit 55, an analysis unit 57, a signal processing unit 59, an output control unit 61, and a memory M3. As described above, the output unit DP2 may be configured separately from the client terminal 50 or may be built in the client terminal 50.

The reception unit 51 receives data transmitted from the camera 10 or re-distributed from the recorder 30, and stores the data in the recording unit 53 or outputs the data to the decoding unit 55. The data transmitted from the camera 10 is one of data of the first video and an image quality adjustment instruction, data of the first video and data in which the image quality adjustment instruction is encrypted, data of the second video, or data in which data of the second video is encrypted. The image quality adjustment instruction itself may be transmitted to the client terminal 50 without being encrypted by the camera 10. The data re-distributed from the recorder 30 is one of data of the first video and an image quality adjustment instruction, data of the first video and data in which the image quality adjustment instruction is encrypted, data of the second video, data in which data of the second video is encrypted, or data of a video of which image quality is adjusted by the recorder 30.

The recording unit 53 is a semiconductor memory (for example, a flash memory), a hard disk drive (HDD), a solid state drive (SSD) built in the client terminal 50, or an external storage medium such as a memory card (for example, an SD card) not built in the client terminal 50. The recording unit 53 records the data received by the reception unit 51. When the recording unit 53 is a memory card, the recording unit 53 is detachably attached to the casing of the client terminal 50. The recording unit 53 may store data obtained by decoding the data received by the reception unit 51 by the decoding unit 55 or data of a video whose image quality is adjusted (restored) so as to have visibility equivalent to the above-described predetermined visibility by the signal processing unit 59.

The decoding unit 55 is configured using, for example, a processor such as a CPU, an MPU, a DSP, or an FPGA. The decoding unit 55 reads and decodes the data stored in the recording unit 53 (that is, the data received by the reception unit 51). In the case where the data received by the reception unit 51 has been encrypted by the camera 10, the decoding unit 55 decrypts the data by using an encryption key common to the camera 10, and then decodes the encoded data.

The analysis unit 57 is configured using, for example, a processor such as a CPU, an MPU, a DSP, or an FPGA. The analysis unit 57 determines whether or not the image quality adjustment instruction is included in the output of the decoding unit 55. When it is determined that the image quality adjustment instruction is included, the analysis unit 57 analyzes the contents, and analyzes what filter coefficient may be used in edge emphasis for the first video data included in the output of the decoding unit 55 and what other signal process (for example, automatic gain control) may be performed. The analysis unit 57 outputs the first video data and the analysis result regarding the image quality adjustment process to the signal processing unit 59. Further, the analysis unit 57 writes the analysis result regarding the image quality adjustment process in addition to the setting information retained in the memory M3. The added analysis result is referred to and used in the image quality adjustment process by the signal processing unit 59. When the image quality adjustment instruction is not included in the output of the decoding unit 55 (that is, a second video is generated by the camera 10), the analysis unit 57 may output data of the second video directly to the output control unit 41.

The signal processing unit 59 is configured using, for example, a processor such as a CPU, an MPU, a DSP, or an FPGA. The signal processing unit 59 functions as a control unit of the client terminal 50, and performs a control process for integrally controlling the operation of each unit of the client terminal 50, a data input and output process between respective units of the client terminal 50, a data operation (calculation) process, and a data storage process. The signal processing unit 59 operates according to the program and data stored in the memory M2. The signal processing unit 59 has, for example, a timer (not shown) and acquires current time information.

The signal processing unit 59 performs a predetermined recognition process (for example, face detection, counting of the number of people, recognition of a license plate of a vehicle and a head mark of a railroad) by using video data recorded in the recording unit 53.

The signal processing unit 59 uses the memory M3 during operation, and generates data of a video having visibility equivalent to the above-described predetermined visibility from the data of the first video, based on the image quality adjustment instruction output from the analysis unit 57, by using the image processing parameter (for example, information for specifying the filter coefficient) included in the image quality adjustment instruction. In FIG. 4, the configuration of the signal processing unit 59 is illustrated as an example in order to show the contents of various types of signal processes performed by the signal processing unit 39.

Specifically, the signal processing unit 59 includes a gain control unit 591, an NR unit 592, an edge emphasizing unit 593, and a signal processing control unit 594. The output of the analysis unit 57 (that is, the first video data decoded by the decoding unit 55 and the image quality adjustment instruction generated by the camera 10) is input to the signal processing unit 59. The output of the signal processing unit 59 is input to the output control unit 61.

Upon receipt of an instruction to execute automatic gain control from the signal processing control unit 594, the gain control unit 591 performs the process of automatic gain control (AGC) using the output (data of the first video) of the analysis unit 57. Thus, the gain control unit 591 can adjust appropriately the brightness of the data of the first video which is the output of the analysis unit 57 (see FIG. 5B). On the other hand, upon receipt of an instruction not to execute automatic gain control from the signal processing control unit 594, the gain control unit 591 omits the automatic gain control process described above and outputs the output (data of the first video) of the analysis unit 57 to the NR unit 532.

The NR unit 592 performs a noise reduction process for reducing the noise component superimposed on the data of the first video by using the output of the gain control unit 591. Since the noise reduction process in the NR unit 592 is performed by a known technique, a detailed description thereof will be omitted. The noise reduction process in the NR unit 592 may be omitted or may be executed without omission, in the signal processing unit 59 of the client terminal 50.

Upon receiving an instruction to execute edge emphasis from the signal processing control unit 594, the edge emphasizing unit 593 performs the edge emphasis process using the output (data of the first video) of the NR unit 592 such that the visibility of the first video is equivalent to the above-described predetermined visibility (high image quality). The edge emphasis process is executed by using a so-called known technique, for example, using a filter (an example of an image processing parameter) having a size corresponding to 3*3 pixels and having a filter coefficient corresponding to each pixel. Through the edge emphasis process, for example, a video with high visibility is obtained in which the subject portion (in other words, not the background portion) such as texts, numbers, human faces, and contours in the video is conspicuous. On the other hand, upon receiving an instruction not to execute edge emphasis from the signal processing control unit 594, the edge emphasizing unit 593 omits the edge emphasis process described above and outputs the output of the NR unit 592 to the output control unit 61.

The signal processing control unit 594 refers to the setting information retained in the memory M3, for example, and outputs an execution instruction or a non-execution instruction of the automatic gain control to the gain control unit 591. The setting information retained in the memory M3 includes information indicating the presence or absence of the execution of the automatic gain control. The signal processing control unit 594 refers to the setting information retained in the memory M3, for example, and outputs an execution instruction or a non-execution instruction of the edge emphasis to the edge emphasizing unit 593. When outputting an instruction to execute edge emphasis to the edge emphasizing unit 593, the signal processing control unit 594 may specify and obtain the filter coefficient, based on information for specifying the filter coefficient (in other words, information for specifying the filter coefficient, analyzed by the analysis unit 57), which is included in the setting information retained in the memory M3, and output the execution instruction including the filter coefficient to the edge emphasizing unit 593.

Here, an image quality adjustment process in the signal processing control unit 594 of the signal processing unit 59 (for example, edge emphasis in the client terminal 50) will be briefly described.

The signal processing control unit 594 extracts information for specifying the filter coefficient (in other words, information for specifying the filter coefficient, analyzed by the analysis unit 57) to be used in edge emphasis by the edge emphasizing unit 593, from the output (analysis result) of the analysis unit 57. For example, the signal processing control unit 594 extracts information such as "numerator 4, denominator 32" as information for specifying the filter coefficient (in other words, information for specifying the filter coefficient, analyzed by the analysis unit 57). The signal processing control unit 594 generates an instruction to execute edge emphasis including the filter coefficient equivalent to the filter coefficient (F1), based on the extracted information such as "numerator 4, denominator 32", and outputs the generated instruction to the edge emphasizing unit 593.

The edge emphasizing unit 593 performs setting to use the filter coefficient included in the execution instruction from the signal processing control unit 594, and performs the edge emphasis process using the output of the NR unit 592 (first video data) and the filter coefficient set based on the execution instruction from the signal processing control unit 594 such that the visibility of the first video is equivalent to the above-described predetermined visibility (high image quality). Thus, the signal processing unit 59 of the client terminal 50 can adjust the image quality of the first video such that the visibility of the first video generated by the camera 10 is equivalent to the above-described predetermined visibility (high image quality), and can obtain video data with high visibility.

The output control unit 61 outputs the data of a video having the visibility equivalent to the above-described predetermined visibility (high image quality) generated by the signal processing unit 59, to the output unit DP2, or records the data of the video in the recording unit 53.

The memory M3 is configured by using, for example, a RAM and a ROM, and temporarily stores programs and data necessary for executing the operation of the client terminal 50, information, data, or the like generated during operation. The RAM is, for example, a working memory used in the operation of the signal processing unit 59. The ROM stores in advance a program and data for controlling the signal processing unit 59, for example. Further, the memory M3 stores, for example, identification information (for example, a serial number) for identifying the client terminal 50 and various types of setting information. The memory M3 stores setting information including the presence or absence of decryption for encryption, the presence or absence of automatic gain control or edge emphasis, an encryption key, and the like.

Figure 5B:
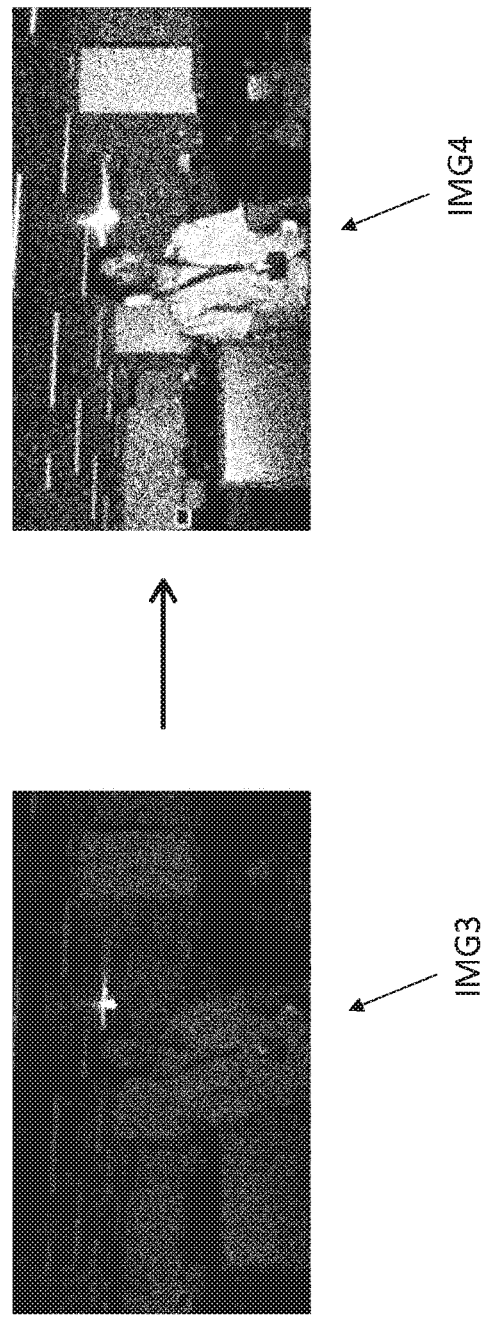
FIG. 5B is a diagram showing an example in which a video whose brightness is not appropriate is restored to a video whose brightness is appropriately adjusted by automatic gain control.

FIG. 5A is a diagram showing an example in which a first video IMG1 is restored to a video IMG2 having visibility equivalent to a predetermined visibility by edge emphasis. FIG. 5B is a diagram showing an example in which a video IMG3 whose brightness is not appropriate is restored to a video IMG4 whose brightness is appropriately adjusted by automatic gain control.

As shown in FIG. 5B, with respect to the video IMG3 obtained by the camera 10 capturing an image, for example, in a dark place or at night, if the automatic gain control is not performed in the camera 10, the brightness is not appropriately adjusted. Thus, the visibility of the video IMG3 is deteriorated, and the video IMG3 is not suitable for the recognition process using video at the recorder 30 or the client terminal 50. However, even if automatic gain control is not performed in the camera 10 as in Embodiment 1, if automatic gain control is performed in the recorder 30 or the client terminal 50, it becomes a video suitable for the recognition process using video in the recorder 30 or the client terminal 50.

As shown in FIG. 5A, for example, if edge emphasis is not performed in the camera 10, with respect to the first video IMG1 obtained by the camera 10 capturing an image, the outlines of characters in the first video IMG1 are not displayed clearly to such an extent that a person such as a user can browse and discriminate the character. For example, in the first video IMG1, the mark BF1 of "P" indicating the parking lot, the character BF2 of "SALE" indicating the sale, and the character BF3 of "24" indicating the 24-hour business are all blurred, so the resolution is low and the visibility is deteriorated. Thus, the first video IMG1 is not suitable for the recognition process using video in the recorder 30 or the client terminal 50. However, as in Embodiment 1, even if edge emphasis is not performed in the camera 10, if edge emphasis is performed to have visibility equivalent to the above-described predetermined visibility (high image quality) in the recorder 30 or the client terminal 50, the first video IMG1 becomes a video IMG4 suitable for the recognition process using a video in the recorder 30 or the client terminal 50. For example, in the video IMG4, the mark AF1 of "P" indicating the parking lot, the character AF2 of "SALE" indicating the sale, and the character AF3 of "24" indicating the 24-hour business are all clear, so the resolution is high and the visibility is good.

Next, examples of the operation procedures of the signal processing units 13, 39, and 59 (see FIGS. 2, 3, and 4) of the camera 10, the recorder 30, and the client terminal 50 in Embodiment 1 will be described with reference to FIGS. 6 and 7.

Figure 6:
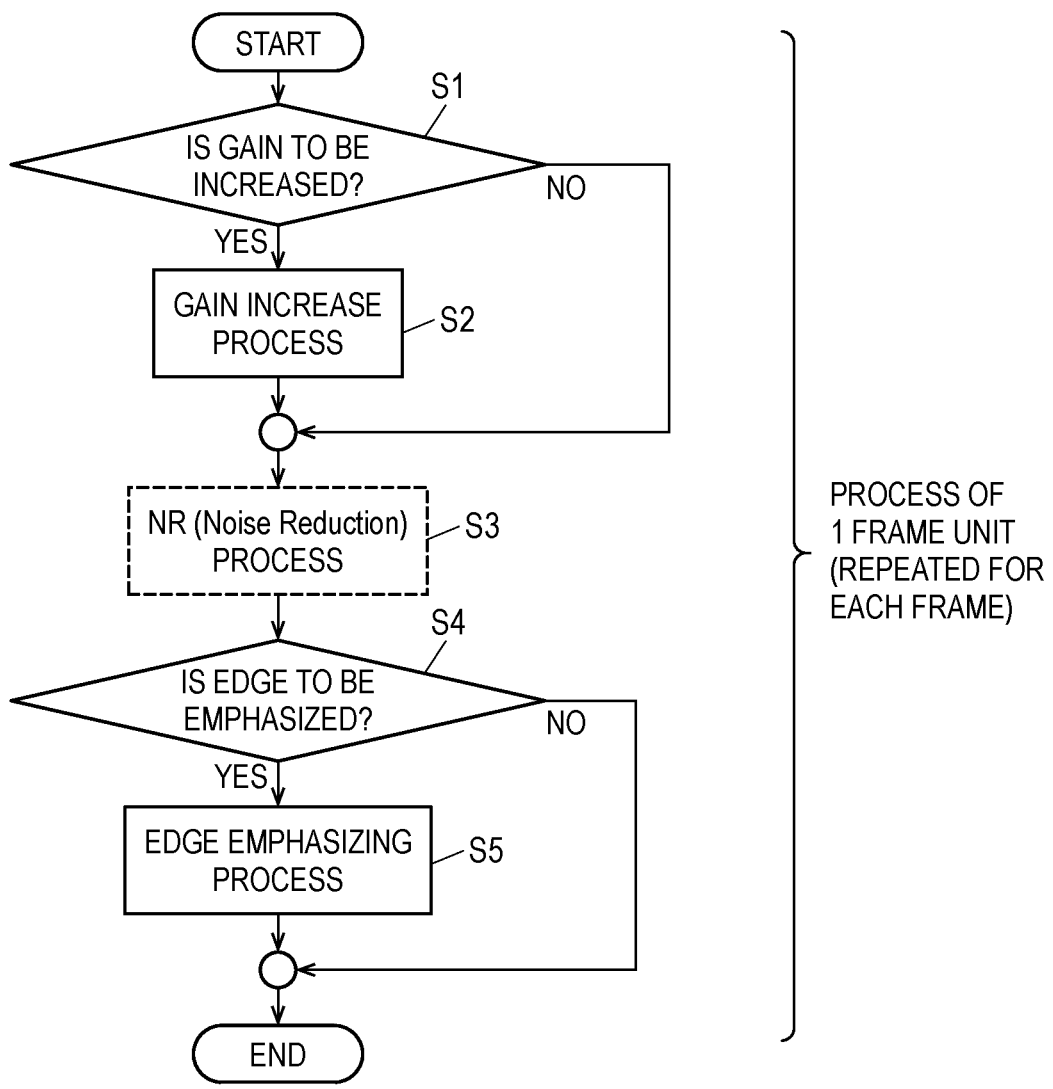
FIG. 6 is a flowchart showing an example of an operation procedure of a signal processing unit of each of a camera, a recorder, and a client terminal according to Embodiment 1.

FIG. 6 is a flowchart showing an example of operation procedures of the signal processing units 13, 39, and 59 of the camera 10, the recorder 30, and the client terminal 50 according to Embodiment 1. In the description of FIG. 6, a description will be given as an operation procedure in the case of the respective execution entities in the order of the camera 10, the recorder 30, and the client terminal 50 which are the execution entities of each series of processes (steps). In addition, a series of processes shown in FIG. 6 is executed, with one image (one frame) constituting a video as a processing unit. Therefore, for example, when the frame rate of the camera 10 is 30 frame-per-second (fps), the series of processes shown in FIG. 6 is repeated 30 times per second. Operation of signal processing unit 13 of camera 10

In FIG. 6, the signal processing unit 13 determines whether or not to execute automatic gain control (for example, gain increase) based on, for example, information on whether or not automatic gain control is to be executed, included in the setting information retained in the memory M1 (S1). When it is determined that automatic gain control is not to be executed (NO in S1), the processes of the signal processing unit 13 proceed to step S3. On the other hand, when it is determined that automatic gain control is to be executed (YES in S1), the signal processing unit 13 executes automatic gain control (for example, gain increase) in the gain control unit 131 (S2). Thus, as shown in FIG. 5B, for example, the camera 10 can obtain video data having brightness suitable for the recognition process using video performed in the recorder 30 or the client terminal 50.

After step S2 or when it is determined that automatic gain control is not to be executed, the signal processing unit 13 performs a noise reduction process for reducing noise components superimposed on the electric signal of the subject image by using the output of the gain control unit 131 (S3). Thus, when noise components are superimposed on the electric signal of the subject image at the imaging time of the imaging unit 11, for example, the camera 10 can reduce unnecessary noise components before encoding in the encoding unit 15 and reduce the code amount of data in the encoding unit 15.

After step S3, the signal processing unit 13 determines whether or not to execute edge emphasis, based on, for example, information on whether or not edge emphasis is to be executed, included in the setting information retained in the memory M1 (S4). When it is determined that edge emphasis is not to be executed (NO in S4), the process of the signal processing unit 13 is completed. On the other hand, when it is determined that edge emphasis is to be executed (YES in S4), the signal processing unit 13 sets the filter coefficient used for edge emphasis process, for example, included in the setting information retained in the memory M1 in the edge emphasizing unit 133, and executes the output (video data) of the NR unit 132 in the edge emphasizing unit 133 by using the filter coefficient (S5). The signal processing unit 13 generates an image quality adjustment instruction including an image processing parameter (for example, information for specifying the above-described filter coefficient (F1) such as "numerator 4, denominator 32") for adjusting image quality such that the visibility of the video subjected to the process of step S5 (first video) is equivalent to the above-described predetermined visibility (S5). Thus, the camera 10 can obtain data of a video having visibility lower (in other words, the code amount of data is low) than the visibility suitable for the recognition process using a video in the recorder 30 or the client terminal 50, and it is possible to suppress an increase in traffic load of the network NW caused by data transmission. Operations of signal processing unit 39 of recorder 30 and signal processing unit 59 of client terminal 50

In FIG. 6, the signal processing units 39 and 59 determine whether or not to execute automatic gain control (for example, gain increase) based on, for example, information on whether or not automatic gain control is to be executed, included in the setting information retained in the memories M2, M3 (S1). When it is determined that automatic gain control is not to be executed (NO in S1), the processes of the signal processing units 39, 59 proceed to step S3.

On the other hand, when it is determined that automatic gain control is to be executed (YES in S1), the signal processing units 39 and 59 execute automatic gain control (for example, gain increase) in the gain control units 391 and 591 (S2). Thus, as shown in FIG. 5B, the recorder 30 or the client terminal 50 can obtain data of a video having brightness suitable for recognition process using video performed in the recorder 30 or the client terminal 50.

After step S2 or when it is determined that automatic gain control is not executed, the signal processing units 39, 59 perform a noise reduction process for reducing noise components superimposed on the electric signal of the subject image by using the outputs of the gain control units 391 and 591 (S3). Thus, the recorder 30 or the client terminal 50 can obtain video data having visibility (image quality with unnecessary noise components reduced, for example) suitable for a recognition process using video performed in the recorder 30 or the client terminal 50, for example. In the signal processing unit 39 of the recorder 30 and the signal processing unit 59 of the client terminal 50, the noise reduction process of step S3 may be omitted.

After step S3, the signal processing units 39 and 59 determine whether or not to execute edge emphasis, based on, for example, information on whether or not edge emphasis is to be executed, included in the setting information retained in the memories M2, M3 (S4). When it is determined that edge emphasis is not to be executed (NO in S4), the process of the signal processing units 39 and 59 is completed. On the other hand, when it is determined that edge emphasis is to be executed (YES in S4), the signal processing units 39, 59 set the filter coefficient used for edge emphasis process, for example, included in the setting information retained in the memories M2, M3 in the edge emphasizing unit 133, and executes the outputs (video data) of the NR units 392, 592 in the edge emphasizing units 393, 593 by using the filter coefficient (S5). Thus, as shown in FIG. 5A, the recorder 30 or the client terminal 50 can obtain data of a video having visibility suitable for the recognition process using video performed in the recorder 30 or the client terminal 50, for example.

Figure 7:
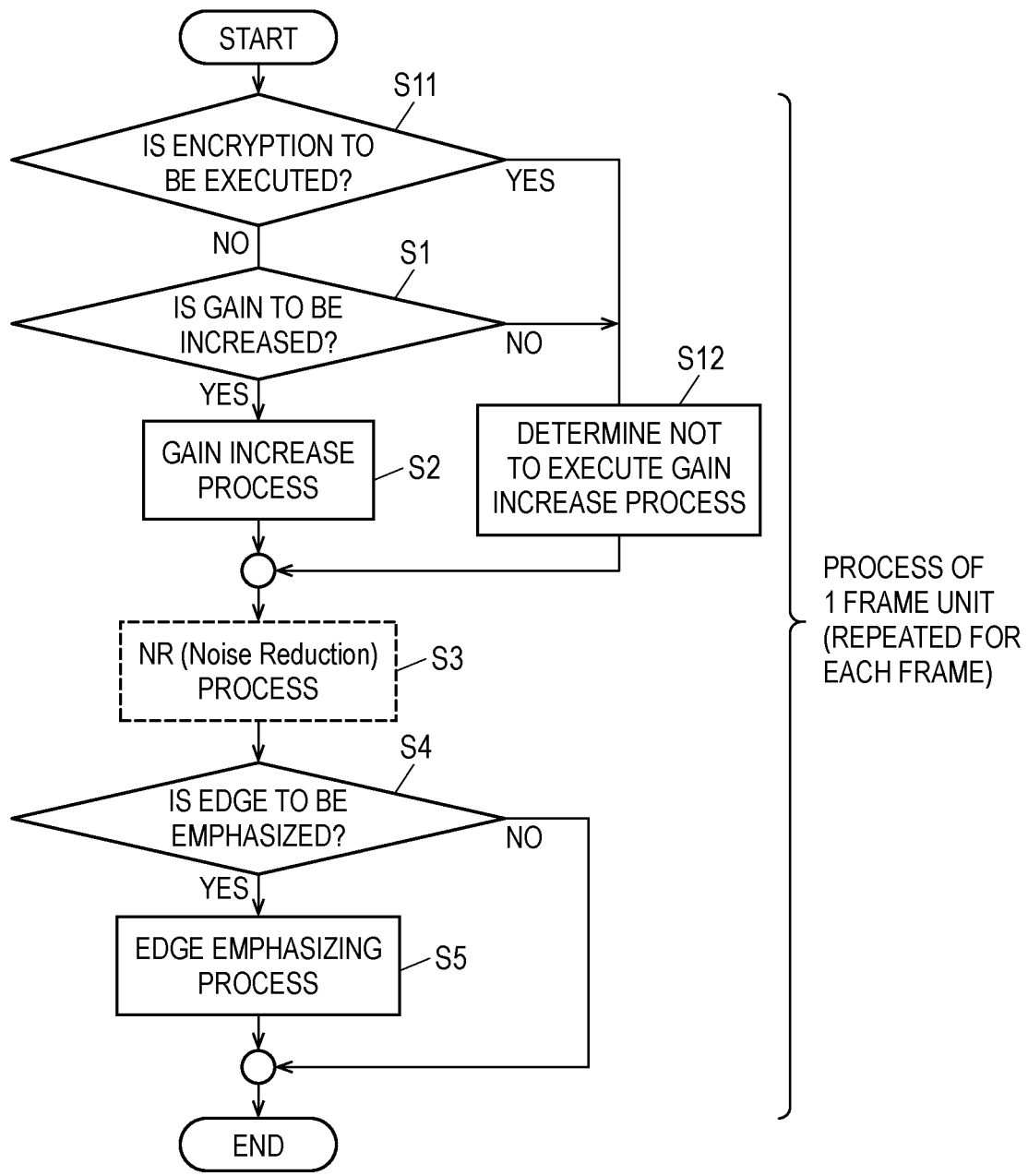
FIG. 7 is a flowchart showing an example of an operation procedure of a signal processing unit of each of the camera, the recorder, and the client terminal according to a modification example of Embodiment 1.

FIG. 7 is a flowchart showing an example of operation procedures of the signal processing units 13, 39, and 59 of the camera 10, the recorder 30, and the client terminal 50 according to a modification example of Embodiment 1. As in the description of FIG. 6, even in the description of FIG. 7, a description will be given as an operation procedure in the case of the respective execution entities in the order of the camera 10, the recorder 30, and the client terminal 50 which are the execution entities of each series of processes (steps). Further, the series of processes shown in FIG. 7 is executed using one frame of each image constituting video as a processing unit. Therefore, for example, when the frame rate of the camera 10 is 30 frame-per-second (fps), the series of processes shown in FIG. 6 is repeated 30 times per second. Further, in the description of FIG. 7, the explanation will be simplified or omitted by giving the same step numbers are given to the same steps as in the description of FIG. 6, and different contents will be described. Operation of signal processing unit 13 of camera 10

In FIG. 7, the signal processing unit 13 determines whether or not to encrypt the video data encoded by the encoding unit 15, based on, for example, information on whether or not encryption is to be executed, included in the setting information retained in the memory M1 (S11). When it is determined that the video data encoded by the encoding unit 15 is to be encrypted (YES in S11), the signal processing unit 13 determines not to execute automatic gain control (for example, gain increase) (S12). This is because, as described above, when the data of video is encrypted in the encryption unit 17, there is a low possibility that the contents of video is seen by a third party until the data is decrypted in the recorder 30 or the client terminal 50, the video may be restored into a video having the visibility equivalent to the above-described predetermined visibility (high image quality) in the recorder 30 or the client terminal 50, and thus it is not necessary to increase the code amount of the camera 10 by generating a video having the visibility equivalent to the above-described predetermined visibility (high image quality) in the camera 10. After step S12, the process of the signal processing unit 13 proceeds to step S3.

When it is determined that the video data encoded by the encoding unit 15 is not to be encrypted (NO, S11), the signal processing unit 13 determines whether or not to execute automatic gain control (for example, gain increase) based on, for example, information on whether or not automatic gain control is to be executed, included in the setting information retained in the memory M1 (S1). When it is determined that automatic gain control is not to be executed (NO in S1), the processes of the signal processing unit 13 proceed in the order of step S12→step S3. On the other hand, since the subsequent processes when it is determined to execute the automatic gain control are the same as the processes after step 2 in FIG. 6, the description will be omitted. Operations of signal processing unit 39 of recorder 30, and signal processing unit 59 of client terminal 50

In FIG. 7, the signal processing units 39, 59 determine whether or not decryption for encryption is to be executed, based on, for example, information on whether or not decryption for encryption is to be executed, included in the setting information retained in the memories M2, M3 (S11). When it is determined that decoding for encryption is to be executed (YES in S11), the signal processing units 39, 59 determine to execute automatic gain control (for example, gain increase) (S12). This is because when the data of video is encrypted in the camera 10, automatic gain control (for example, gain increase) is not performed, and image quality adjustment is required such that video having the visibility equivalent to the predetermined visibility (high image quality) can be obtained in the recorder 30 or the client terminal 50. After step S12, the processes of the signal processing units 39, 59 proceed to step S3.

On the other hand, when it is determined that decryption for encryption is not to be executed (NO in S11), the signal processing units 39, 59 determine whether or not to execute automatic gain control (for example, gain increase) based on, for example, information on whether or not automatic gain control is to be executed, included in the setting information retained in the memories M2, M3 (S1). When it is determined that automatic gain control is not to be executed (NO in S1), the processing of the signal processing units 39, 59 proceed in the order of step S12→step S3. On the other hand, since the subsequent processes when it is determined to execute the automatic gain control are the same as the processes after step 2 in FIG. 6, the description will be omitted.

Incidentally, the process of step S1 in FIG. 7 may be omitted. That is, the determination on whether or not the encryption of video data is executed may correspond to the determination on whether or not the automatic gain control (for example, gain increase) in step S1 of FIG. 6 is executed. Specifically, the case where encryption is performed in step S11 of FIG. 7 corresponds to the case where automatic gain control (for example, gain increase) is not performed in step S1 of FIG. 6, whereas the case where encryption is not performed in step S11 of FIG. 7 corresponds to the case where automatic gain control (for example, gain increase) is performed in step S1 of FIG. 6.

As described above, the video encoding system 100 of Embodiment 1 has a configuration in which the camera 10 that captures a video and the recorder 30 or the client terminal 50 (an example of a video output apparatus) that outputs the video captured by the camera 10 are connected so as to be capable of communicating with each other. The camera 10 generates a first video having visibility lower than a predetermined visibility suitable for a recognition process using a video in the recorder 30 or the client terminal 50, encodes the generated first video, and transmits the encoded first video and an image quality adjustment instruction including an image processing parameter (for example, information for specifying a filter coefficient) for adjusting the visibility of the first video to be equivalent to the predetermined visibility, to the recorder 30 or the client terminal 50. The recorder 30 or the client terminal 50 acquires the first video and the image quality adjustment instruction, transmitted from the camera 10, adjusts the visibility of the first video to be equivalent to the predetermined visibility by using the image processing parameter, based on the image quality adjustment instruction, and outputs the video having the adjusted image quality to the output units DP1, DP2.

Thus, the video encoding system 100 can reduce the processing amount (code amount) of the captured image in the camera 10 at the time of encoding, by reducing the visibility of the captured image transmitted from an image transmission apparatus such as the camera 10 as much as possible, and adjust the visibility of the captured image to be equivalent to desired visibility (for example, the above-described predetermined visibility) after the captured image whose code amount has been reduced is received by the image reception apparatus such as the recorder 30 or the client terminal 50. In other words, the camera 10 can generate data of a first video whose visibility is made as low as possible by omitting the execution of excess processing accompanying the increase of the code amount, such as automatically adjusting the brightness of a video by automatic gain control (for example, gain increase), or performing edge emphasis to make the edges such as contours in a video conspicuous. For example, reducing the visibility as much as possible means that the camera 10 lowers the visibility of the first video to an extent capable of adjusting (in other words, restoring) the lowered visibility so as to be equivalent to a predetermined visibility, in the recorder 30 or the client terminal 50, based on the image quality adjustment instruction.

Accordingly, the video encoding system 100 can reduce the size of video data transmitted from the camera 10 (for example, it is possible to reduce the size by about 10% to 50%), and suppress an increase in the load at the time of data transmission through the network NW. The recorder 30 or the client terminal 50 can generate video with visibility equivalent to a predetermined visibility (high image quality) suitable for the recognition process using video performed in the recorder 30 or the client terminal 50, based on the image quality adjustment instruction transmitted from the camera 10.

In addition, in Embodiment 1, the camera 10 may encode the generated first video and transmit the encoded first video to the recorder 30 or the client terminal, without generating the above-described image quality adjustment instruction. The recorder 30 or the client terminal 50 acquires the first video transmitted from the camera 10, adjusts image quality such that the visibility of the first video becomes equivalent to a predetermined visibility, based on the first video (for example, based on the brightness of the first video data), and outputs the video having the adjusted image quality to the output units DP1, DP2.

Thus, the camera 10 needs not encode the image quality adjustment instruction, so it is possible to relatively reduce the code amount of the data to be transmitted to the recorder 30 or the client terminal 50. Since the recorder 30 or the client terminal 50 may obtain a visibility suitable for the process performed in the recorder 30 or the client terminal 50 simply by performing the gain adjustment, without receiving the image quality adjustment instruction, it is possible to simplify the process of improving the visibility of the first video in the recorder 30 or the client terminal 50.

The camera 10 retains in the memory M1 setting information indicating whether encryption is to be performed on data to be transmitted to the recorder 30 or the client terminal 50. The camera 10 encrypts and then encodes the first video, when the setting information indicating that the encryption is to be performed is held in the memory M1. Here, when the data of video is encrypted in the encryption unit 17, the possibility that the contents of video is seen by a third party until the data is decrypted in the recorder 30 or the client terminal 50 is low, the video may be restored into a video having the visibility equivalent to the above-described predetermined visibility (high image quality) in the recorder 30 or the client terminal 50. Thus, when encrypting the data of video before encoding, it is not necessary to increase the code amount of the camera 10 by generating a video having the above-described predetermined visibility (high image quality) in the camera 10, and the processing load of the camera 10 can be reduced because automatic gain control and edge emphasis processing are not performed more than necessary in the camera 10.

Further, the camera 10 includes a switch (not shown) for switching to any one of a first mode for the camera 10 to generate the first video and a second mode for the camera 10 to generate a second video having visibility equivalent to the predetermined visibility. When the current operation mode is switched to the second mode, the camera 10 generates the second video, encodes the generated second video, and transmits the encoded second video to the recorder 30 or the client terminal 50. Thus, the administrator (an example of the user) of the video encoding system 100 can change the operation mode of the camera 10 easily and flexibly, such as changing the operation mode to the first mode for reducing the code amount in the camera 10 or changing the operation mode to the second mode for generating the second video data in the camera 10, in consideration of the traffic load situation of the network NW, for example. In addition, the switch may be a switch capable of being operated by an administrator as physical hardware, which may be provided in the camera 10, or a switching signal transmitted from the recorder 30 or the client terminal 50 based on the operation of the administrator, for example. The mode of the camera 10 is changed by, for example, the signal processing unit 13.

The camera 10 includes a memory M1 that retains information indicating whether the current operation mode (an example of mode) is a first mode or a second mode as setting information. This enables the camera 10 to accurately know the current operation mode.

In addition, the camera 10 switches the current operation mode (an example of mode) to the first mode in response to an instruction to execute encryption for data to be transmitted to the recorder 30 or the client terminal 50. Thus, when the camera 10 encrypts video data, the camera 10 does not need to generate video data with visibility equivalent to the predetermined visibility (high image quality), so it is possible to reduce the code amount of the video data in the encoding unit 15, and to suppress an increase in the load at the time of data transmission over the network NW.

Further, the recorder 30 or the client terminal 50 acquires information on the camera 10 to be connected (for example, the model number and serial number of the camera), stores the information in the memories M2 and M3, and transmits a switching instruction to switch the current operation mode (an example of mode) to the first mode for the camera 10 to generate the first video to the camera 10, when the information on the camera 10 acquired referred to the memories M2 and M3 satisfies a predetermined condition. Here, the predetermined condition is that the camera 10 can operate corresponding to the operation mode of, for example, the first mode capable of generating first video data and the second mode capable of generating second video data, as the operation mode, and the model number and serial number of the camera satisfying the condition are registered in advance in the memories M2 and M3. The camera 10 switches the current operation mode (an example of mode) to the first mode in response to a switching instruction transmitted from the recorder 30 or the client terminal 50. Thus, the recorder 30 or the client terminal 50 is able to determine that the camera 10 to be connected can generate the first video data, so it is possible to reduce the code amount in the camera 10 and suppress an increase in the load when transmitting data over the network NW.

Further, the image processing parameter included in the image quality adjustment instruction generated by the camera 10 includes information on filter coefficients (information for specifying the filter coefficient, for example) in edge emphasis process performed in the camera 10. Thus, the recorder 30 or the client terminal 50 is capable of reproducing (restoring) the first video transmitted from the connected camera 10 to a video having visibility equivalent to the visibility suitable for the recognition process performed in the recorder 30 or the client terminal 50, and acquiring the video.

Embodiment 2

In Embodiment 2, when the recorder 30 or the client terminal 50 performs a recognition process by using data of video acquired by performing image quality adjustment (in other words, reproducing, restoring) based on the image quality adjustment instruction and as a result, the recognition process fails, an example of instructing to change the encoding parameter and the image processing parameter in the camera 10 will be described.

Figure 8:
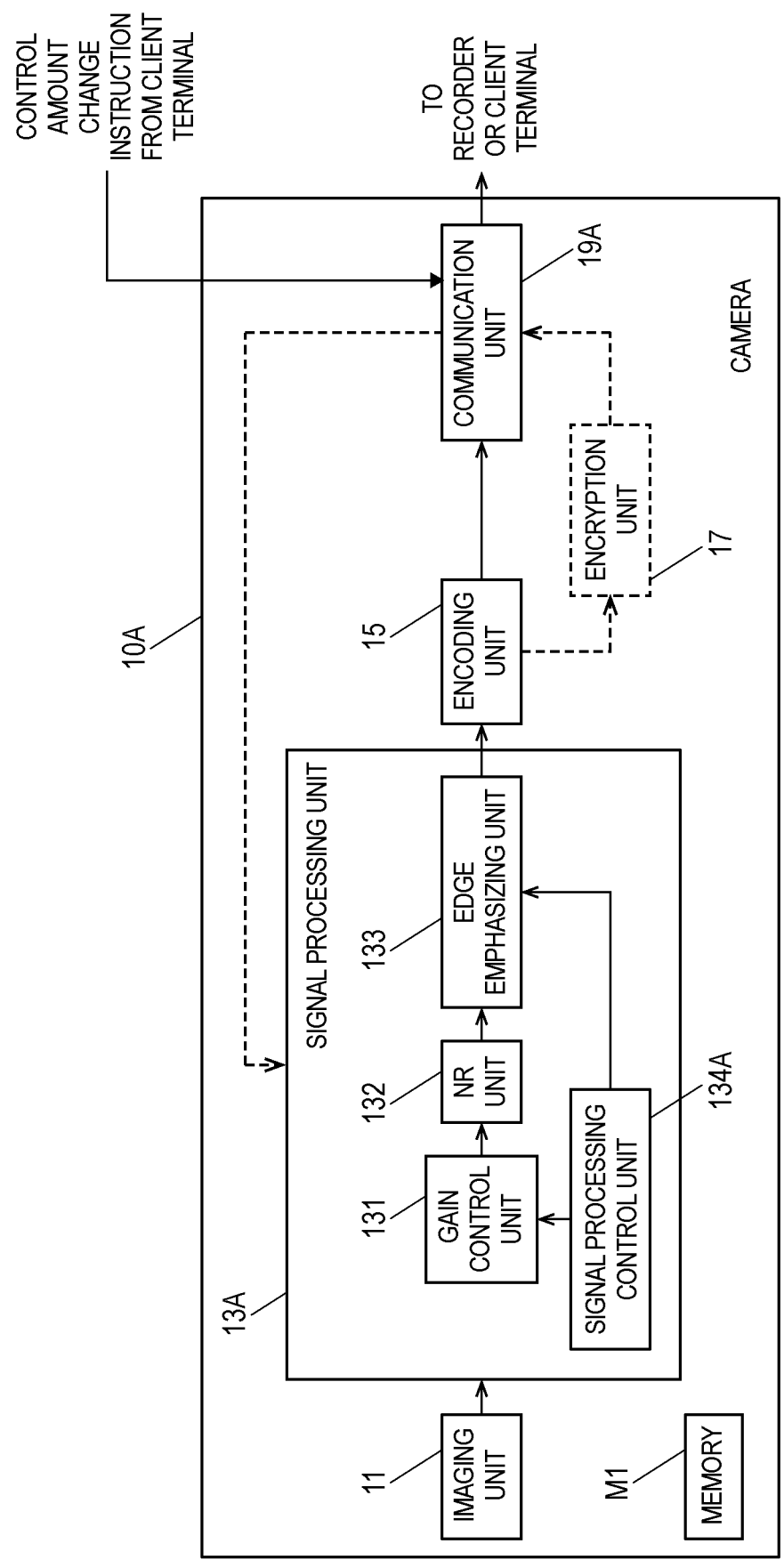
FIG. 8 is a block diagram showing an internal configuration example of a camera according to Embodiment 2.

FIG. 8 is a block diagram showing an internal configuration example of the camera 10A according to Embodiment 2. The camera 10A has a configuration including at least an imaging unit 11, a signal processing unit 13A, an encoding unit 15, an encryption unit 17, a communication unit 19A, and a memory M1. In the description of FIG. 8, with respect to the same constituent elements as the respective corresponding units of FIG. 2, the same reference numerals will be used to simplify or omit the description and different contents will be described.

When receiving a control amount change instruction (see below) transmitted from the client terminal 50A, the communication unit 19A outputs the control amount change instruction to the signal processing unit 13A.

When acquiring the control amount change instruction, the signal processing unit 13A changes, for example, the filter coefficient such that the intensity of the edge emphasis in the edge emphasizing unit 133 is lowered, or reduces the encoding parameter (for example, coding rate) in the encoding unit 15, based on the change instruction of the specific parameter included in the control amount change instruction. In addition, when acquiring the control amount change instruction, the signal processing unit 13A may change the setting information as to whether the automatic gain control is to be executed in the gain control unit 131, for example, from non-execution to execution, based on the execution instruction of the specific process included in the control amount change instruction.

For example, when the filter coefficient is changed such that the intensity of the edge emphasis in the edge emphasizing unit 133 is lowered, the signal processing control unit 134A sets the changed filter coefficient in the edge emphasizing unit 133, and writes the changed filter coefficient in the setting information in the memory M1 for update.

For example, when the encoding parameter in the encoding unit 15 is reduced, the signal processing control unit 134A sets the changed encoding parameter in the encoding unit 15 and writes the changed encoding parameter in the setting information in the memory M1 for update.

For example, when information as to whether the automatic gain control is to be executed in the gain control unit 131 is changed from non-execution to execution, the signal processing control unit 134A outputs an execution instruction to the gain control unit 131 and writes information relating to the execution instruction of automatic gain control in the setting information of the memory M1 for update.

Figure 9:
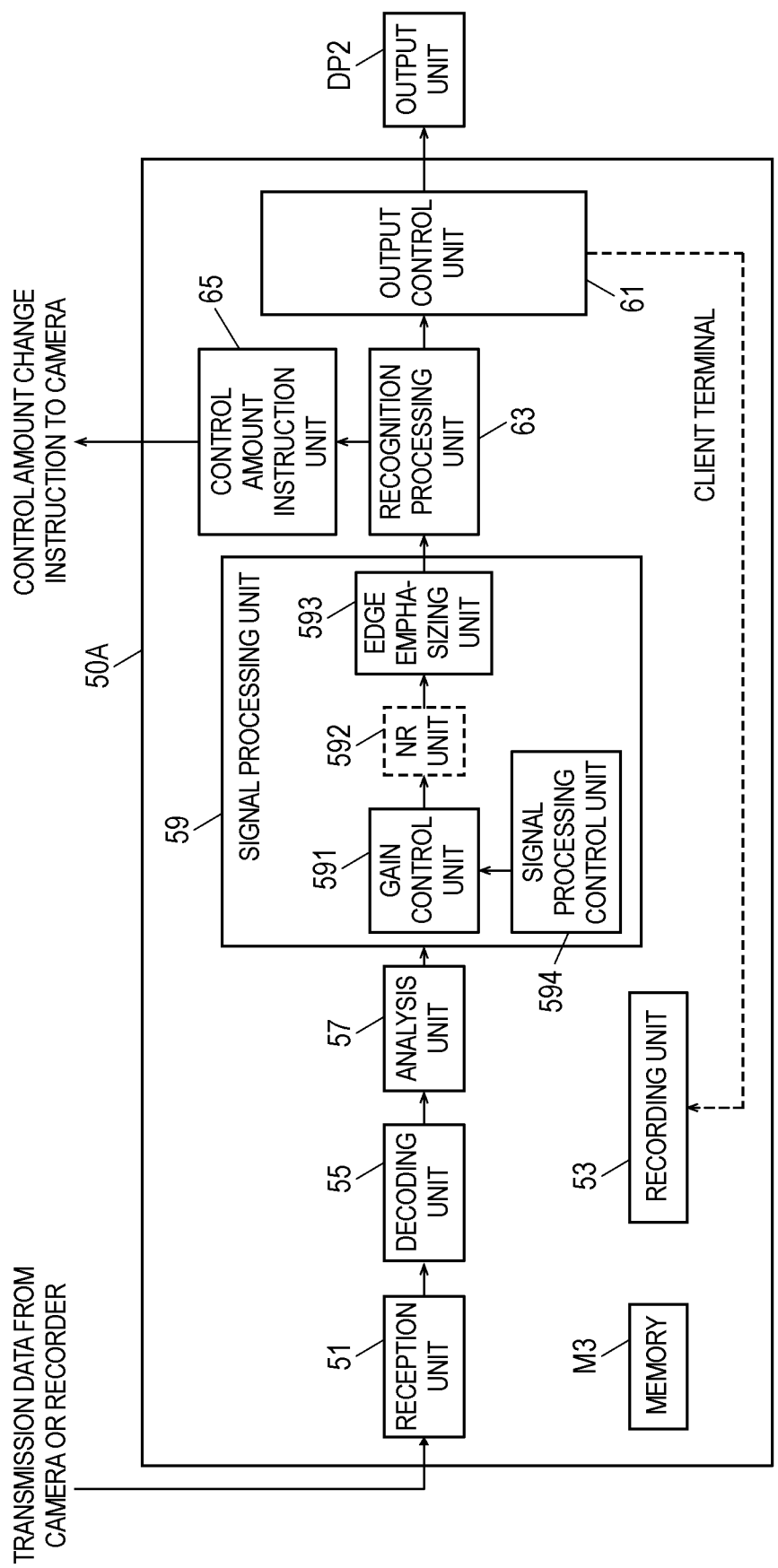
FIG. 9 is a block diagram showing an internal configuration example of a client terminal according to Embodiment 2.

FIG. 9 is a block diagram showing an internal configuration example of the client terminal 50A according to Embodiment 2. The client terminal 50A has a configuration including at least a reception unit 51, a recording unit 53, a decoding unit 55, an analysis unit 57, a signal processing unit 59, an output control unit 61, a recognition processing unit 63, a control amount instruction unit 65, and a memory M3. In the description of FIG. 9, with respect to the same constituent elements as the corresponding units in FIG. 4, the same reference numerals will be used to simplify or omit the description and different contents will be described.

The recognition processing unit 63 is configured using, for example, a processor such as a CPU, an MPU, a DSP, or an FPGA. The recognition processing unit 63 performs a predetermined recognition process (for example, face detection, counting of the number of people, recognition of a license plate of a vehicle and a head mark of a railroad) by using video data recorded in the recording unit 53. In the client terminal 50A of Embodiment 2, since the configuration of the recognition processing unit 63 is explicitly added as compared with the configuration of the client terminal 50 of Embodiment 1, unlike the client terminal 50 of Embodiment 1, the recognition process may not be performed in the signal processing unit 59 of the client terminal 50A of Embodiment 2.

When it is determined that the recognition process (for example, face detection) is successful, the recognition processing unit 63 cuts out a frame portion such as a rectangle including a face obtained by face detection in video data and transmits the frame portion to an external server device (not shown) through the output control unit 61. Thus, the external server device can verify whether or not the data of the video of the face part transmitted from the client terminal 50A matches the data of the video of the face part registered in advance in the recording device of the server device, and outputs an alarm when it is determined that both the data items match, thereby making it possible to secure security. When it is determined that both the data items match, the server device may estimate the attribute of the face (for example, age, sex, facial expression).

Figure 11:
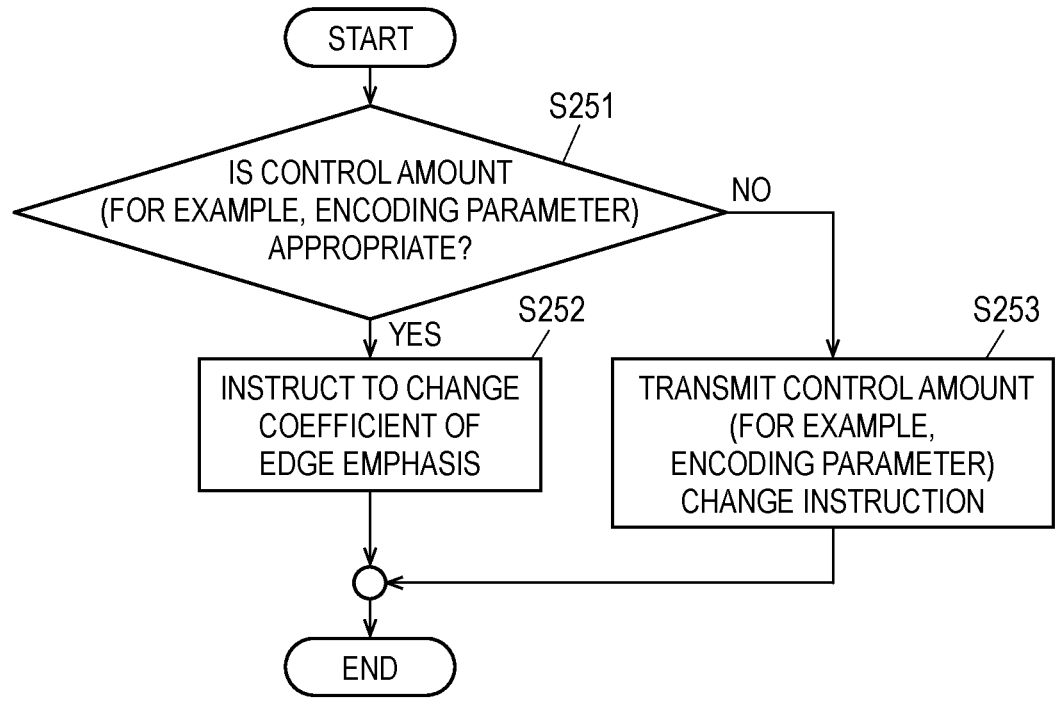
FIG. 11 is a flowchart showing an example of an operation procedure of a generation process of a control amount change instruction of the client terminal according to Embodiment 2.

On the other hand, when it is determined that the recognition process (for example, face detection) has failed, the recognition processing unit 63 assumes that proper encoding or edge emphasis has not been performed in the camera 10, for example, and generates a control amount change instruction to change either the encoding parameter (for example, coding rate) or the filter coefficient used for the edge emphasis, and outputs the control amount change instruction to the control amount instruction unit 65 (see FIG. 11).

In a case of acquiring the control amount change instruction generated by the recognition processing unit 63, the control amount instruction unit 65 transmits the control amount change instruction to the camera 10.

Next, an example of the operation procedure of the client terminal 50A in Embodiment 2 will be described with reference to FIG. 10 and FIG. 11.

Figure 10:
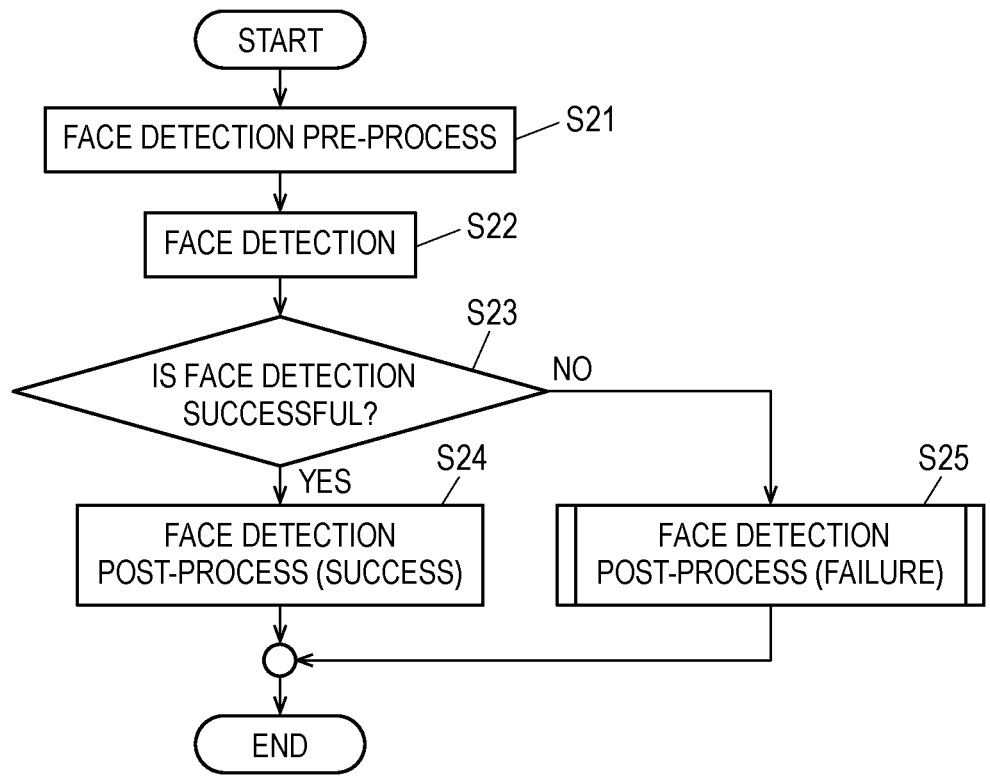
FIG. 10 is a flowchart showing an example of an operation procedure of a recognition process of the client terminal according to Embodiment 2.

FIG. 10 is a flowchart showing an example of the operation procedure of a recognition process of the client terminal 50A according to Embodiment 2. In FIG. 10, the face detection process is described as an example of the recognition process, but the present invention is not limited to the face detection process, and for example, counting the number of people, and a recognition process of a vehicle license plate or a railway head mark may be used.

In FIG. 10, the signal processing unit 59 of the client terminal 50A performs a process (for example, automatic gain control, edge emphasis) of adjusting (in other words, reproducing, restoring) image quality of the video such that the visibility of the first video becomes equivalent to the above-described predetermined visibility, by using the data transmitted from the camera 10A or the recorder 30, as a face detection pre-process, based on the image quality adjustment instruction (S21).

The recognition processing unit 63 of the client terminal 50A performs a face detection process (that is, a process of detecting the face of a person in the video after adjusting its image quality) by using the video data with adjusted image quality generated in step S21 (S22).

When it is determined that the process of step S22 is successful (YES in S23), as a face detection post-process (success), the recognition processing unit 63 of the client terminal 50A cuts out, for example, a frame portion such as a rectangle including a face obtained by face detection in video data and transmits the frame portion to an external server device (not shown) through the output control unit 61 (S24). After step S24, the process shown in FIG. 10 is completed.

On the other hand, when it is determined that the process in step S22 has failed (NO in S23), as a face detection post-process (failure), the recognition processing unit 63 of the client terminal 50A assumes that proper encoding or edge emphasis has not been performed in the camera 10, for example, and generates a control amount change instruction to change either the encoding parameter (for example, coding rate) or the filter coefficient used for the edge emphasis, and outputs the control amount change instruction to the control amount instruction unit 65 (S25). Details of generation of the control amount change instruction in the recognition processing unit 63 will be described with reference to FIG. 11. After step S25, the process shown in FIG. 10 is completed.

FIG. 11 is a flowchart showing an example of an operation procedure of a generation process of a control amount change instruction of the client terminal 50A according to Embodiment 2.

In FIG. 11, the recognition processing unit 63 of the client terminal 50A determines whether or not the encoding parameter (for example, coding rate) used in the current camera 10A is an appropriate value for the face detection algorithm used by the recognition processing unit 63, as a face detection post-process (failure) (S251). This is because when the camera 10A encodes the video data, if the encoding parameter (for example, coding rate) is increased and the noise associated with encoding increases, the visibility of the video obtained by the face detection pre-process in the client terminal 50A does not reach the visibility suitable for face detection. An appropriate encoding parameter (for example, coding rate) for the face detection algorithm used by the recognition processing unit 63 may be set to, for example, setting information retained in the memory M1, and may be acquired from an external reference server (not shown) or the like. Further, the value of the encoding parameter (for example, coding rate) used in the current camera 10A may be set, for example, in the setting information held in the memory M1, or may be directly inquired to the camera 10A and acquired.

When it is determined that the encoding parameter (for example, coding rate) used in the current camera 10A is an appropriate value (YES in S251), there is no need to change the encoding parameter (for example, coding rate), the recognition processing unit 63 of the client terminal 50A generates a control amount change instruction to change the filter coefficient so as to lower the intensity of the edge emphasis in the edge emphasizing unit 133 of the camera 10A (S252). The recognition processing unit 63 of the client terminal 50A transmits the control amount change instruction generated in step S252 to the camera 10A through the control amount instruction unit 65 (in other words, feedback the control amount change instruction to the camera 10A).

On the other hand, when it is determined that the encoding parameter (for example, coding rate) used in the current camera 10A is not an appropriate value (NO in S251), it is necessary to change the encoding parameter (for example, coding rate), the recognition processing unit 63 of the client terminal 50A generates a control amount change instruction to reduce the encoding parameter in the encoding unit 15 of the camera 10A (S253). The recognition processing unit 63 of the client terminal 50A transmits the control amount change instruction generated in step S253 to the camera 10A through the control amount instruction unit 65 (in other words, feedback the control amount change instruction to the camera 10A).

As described above, in the video encoding system 100 of Embodiment 2, when the recognition process using video with adjusted image quality fails, the recorder 30 or the client terminal 50A transmits a change instruction (control amount change instruction) to change the image processing parameter such that video having visibility lower than the visibility of the first video can be generated, to the camera 10A. The camera 10A changes the image processing parameter (for example, a filter coefficient) according to the control amount change instruction transmitted from the recorder 30 or the client terminal 50A, and generates video with lower visibility than the visibility of the first video by using the changed image processing parameter (for example, a filter coefficient).

Thus, even if the recognition process in the recorder 30 or the client terminal 50A fails, the camera 10A can generate video with lower visibility, which is lower in intensity than the first video, obtained by edge emphasis (in other words, the visibility in which the occurrence of noise is suppressed at the time of processing encoding in the encoding unit 15), based on the control amount change instruction from the recorder 30 or the client terminal 50A. Thus, for example, the recorder 30 or the client terminal 50A can cause the camera 10A to generate a video of the visibility having the lowest encoding noise until the recognition process in the recorder 30 or the client terminal 50A succeeds.

In the video encoding system 100 of Embodiment 2, when the recognition process using video with adjusted image quality fails, the recorder 30 or the client terminal 50A transmits a change instruction (control amount change instruction) to change the encoding parameter used for encoding the first video low, to the camera 10A. The camera 10A changes the encoding parameter (for example, a coding rate) according to the control amount change instruction transmitted from the recorder 30 or the client terminal 50A, and encodes the first video by using the changed encoding parameter (for example, a coding rate).

Thus, even if the recognition process in the recorder 30 or the client terminal 50A fails, the camera 10A can generate video with lower visibility than the visibility of the first video (in other words, the image quality in which the occurrence of noise is suppressed at the time of processing encoding in the encoding unit 15 by using encoding parameters suitable for the recognition process in the recorder 30 or the client terminal 50A), based on the control amount change instruction from the recorder 30 or the client terminal 50A. Thus, for example, the recorder 30 or the client terminal 50A can cause the camera 10A to generate a video of the visibility having the lowest encoding noise until the recognition process in the recorder 30 or the client terminal 50A succeeds.

While various embodiments have been described with reference to the drawings, it is to be understood that the present disclosure is not limited thereto. It is apparent to those skilled in the art that changes and modifications are conceivable within the scope described in the claims, and it would be appreciated that those naturally belong to the technical scope of the present disclosure. Further, within the scope not deviating from the gist of the invention, respective constituent elements in the above-described various embodiments may be arbitrarily combined.

The present disclosure is useful as a video encoding system and a video encoding method, which reduce the code amount of a captured image by reducing the visibility of the captured image transmitted from an image transmission apparatus as much as possible, and then appropriately adjusts the visibility of the captured image to be equivalent to desired visibility after the captured image whose code amount has been reduced is received by an image reception apparatus.

This present application is based upon Japanese Patent Application (Patent Application No. 2017-242086) filed on Dec. 18, 2017, the contents of which are incorporated by reference.

What is claimed is:
1. A video encoding system comprising:
   a camera that captures a video; and
   a video recorder that outputs the video captured by the camera, the camera and the video recorder being separate devices connected by a network so as to be capable of communicating, the network being external of the camera and the video recorder,
   wherein the camera:
       generates first video in a first mode and generates second video in a second mode;
       in the first mode, generates the first video having visibility lower than a predetermined visibility suitable for a process based on a video in the video recorder;
       in the first mode, encodes the generated first video, and transmits to the video recorder via the network the encoded first video and an adjustment instruction including an image processing parameter for adjusting the visibility of the first video to be equivalent to the predetermined visibility, the encoded first video and the adjustment instruction being transmit to the video recorder via the network externally of the camera;
       in the second mode, generates the second video having the predetermined visibility by using the image processing parameter, based on the video in the video recorder, and in the second mode, encodes the generated second video, and transmits the encoded second video to the video recorder via the network without generating the adjustment instruction; and wherein the video recorder:
acquires one of the first video and the adjustment instruction or the second video transmitted from the camera via the network; and
when the first video and the adjustment instruction are acquired, adjusts the visibility of the first video to be equivalent to the predetermined visibility by using the image processing parameter, based on the adjustment instruction.

2. The video encoding system according to claim 1, wherein the camera:
stores setting information indicating whether or not to perform encryption of data to be transmitted to the video recorder in a memory; and
encrypts and then encodes the first video when the setting information indicating that the encryption is to be performed is stored in the memory.

3. The video encoding system according to claim 1, wherein the camera:
further comprises a switch for switching to any one of the first mode for the camera to generate the first video and the second mode for the camera to generate the second video having the predetermined visibility; and
when switched to the second mode, generates the second video, encodes the generated second video, and transmits the encoded second video to the video recorder via the network.

4. The video encoding system according to claim 3, wherein the camera further comprises a memory that stores information indicating whether a current mode is the first mode or the second mode.

5. The video encoding system according to claim 3, wherein the camera switches the current mode to the first mode, in response to an instruction to perform an encryption of data to be transmitted to the video recorder.

6. The video encoding system according to claim 1, wherein when the video recorder acquires information on the camera and the acquired information on the camera satisfies a predetermined condition, the video recorder transmits a switching instruction to the camera via the network to switch a current mode to the first mode for the camera to generate the first video to the camera; and
wherein the camera switches the current mode to the first mode, in response to the switching instruction transmitted from the video recorder.

7. The video encoding system according to claim 1, wherein the video recorder transmits a change instruction to change the image processing parameter such that a third video having lower visibility than the visibility of the first video is capable of being generated, to the camera via the network when the process using the adjusted first video fails; and
wherein the camera changes the image processing parameter in response to the change instruction transmitted from the video recorder, and generates the third video having lower visibility than the visibility of the first video based on the changed image processing parameter.

8. The video encoding system according to claim 1, wherein the video recorder transmits a change instruction to the camera via the network to change an encoding parameter used for encoding the first video to be low, to the camera when the process using the adjusted first video fails; and
wherein the camera changes the encoding parameter in response to the change instruction transmitted from the video recorder, and encodes the first video based on the changed encoding parameter.

9. The video encoding system according to claim 1, wherein the image processing parameter includes information on a filter coefficient in edge-element emphasis.

10. The video encoding system according to claim 1, wherein the camera transmits the encoded first video and the adjustment instruction to the video recorder via the network externally of the camera without the adjustment instruction being encoded.

11. The video encoding system according to claim 1, wherein the camera, in the first mode, further transmits the encoded first video and the adjustment instruction to a client terminal via the network, the encoded first video and the adjustment instruction being transmit to the client terminal via the network externally of the camera.

12. A video encoding method implemented by a video encoding system having a camera and a video recorder, the video encoding method comprising:
capturing a video by the camera, the camera being separate from the video recorder and connected to the video recorder by a network so as to be capable of communicating with the video recorder, the network being external of the camera and the video recorder;
generating, by the camera, a first video in a first mode, the first mode including:
generating the first video having visibility lower than a predetermined visibility suitable for a process based on a video in the video recorder;
encoding the generated first video; and
transmitting to the video recorder via the network the encoded first video and an adjustment instruction including an image processing parameter for adjusting the visibility of the first video to be equivalent to the predetermined visibility, the encoded first video and the adjustment instruction being transmit to the video recorder via the network externally of the camera;
generating, by the camera, a second video in a second mode, the second mode including:
generating the second video having the predetermined visibility by using the image processing parameter, based on the video in the video recorder;
encoding the generated second video; and
transmitting the encoded second video to the video recorder via the network without generating the adjustment instruction;
acquiring, by the video recorder via the network, one of the first video and the adjustment instruction or the second video, transmitted from the camera; and
when the first video and the adjustment instruction are acquired, adjusting, by the video recorder, the visibility of the first video to be equivalent to the predetermined visibility by using the image processing parameter, based on the adjustment instruction,
wherein the camera and the video recorder are separate devices connected by the network so as to be capable of communicating.

* * * * *